(12) United States Patent
Chen et al.

(10) Patent No.: US 12,072,759 B2
(45) Date of Patent: Aug. 27, 2024

(54) CROSS-REGION SOFTWARE FAILURE RECOVERY

(71) Applicant: Salesforce, Inc., San Francisco, CA (US)

(72) Inventors: Bohan Chen, Los Altos, CA (US); Donald Tam, Hillsborough, CA (US); Benjamin Daniel Hoyt, Eldorado Springs, CO (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/157,699

(22) Filed: Jan. 20, 2023

(65) Prior Publication Data

US 2024/0248789 A1 Jul. 25, 2024

(51) Int. Cl.
  *G06F 11/00* (2006.01)
  *G06F 11/07* (2006.01)
  *G06F 11/30* (2006.01)

(52) U.S. Cl.
  CPC ...... *G06F 11/0793* (2013.01); *G06F 11/0772* (2013.01); *G06F 11/3006* (2013.01)

(58) Field of Classification Search
  CPC ............ G06F 11/0793; G06F 11/0772; G06F 11/3006; G06F 11/0709; G06F 11/2023; G06F 11/203
  See application file for complete search history.

(56) References Cited

U.S. PATENT DOCUMENTS

| | | | |
|---|---|---|---|
| 9,836,342 B1* | 12/2017 | Mahapatra | ............ G06F 11/202 |
| 11,093,356 B2 | 8/2021 | Chen et al. | |
| 2019/0294512 A1 | 9/2019 | Chen | |
| 2020/0097556 A1 | 3/2020 | Chen | |
| 2020/0097592 A1 | 3/2020 | Chen | |
| 2020/0097593 A1 | 3/2020 | Chen | |
| 2020/0210261 A1* | 7/2020 | Reddy | ..................... G06F 21/70 |

(Continued)

OTHER PUBLICATIONS

Tod Golding, "Architecting Multi-Region SaaS Solutions on AWS," AWS Partner Network (APN) Blog, Mar. 26, 2018, 9 pages.

(Continued)

*Primary Examiner* — Joseph D Manoskey
(74) *Attorney, Agent, or Firm* — Kowert, Hood, Munyon, Rankin & Goetzel, P.C.; Dean M. Munyon

(57) ABSTRACT

Techniques are disclosed relating to software failover across multiple computing regions. Software entities in a first computing region implement failure recovery routines on an as-needed basis, which can include utilizing code in a recovery API. These software entities can subscribe to receive failure notifications for that region. When an indication of a regional failure is received (e.g., indicating that some specified threshold of servers in the first computing region have failed or are likely to fail), a failure notification can be published. The computing region can then use a list of subscribing software entities to initiate recovery routines for those entities to failover to a different one of the computing regions. In some implementations, software entities can handle failover for dependent components. Thus, when failover is initiated for a particular software product, the product can initiate failover for any constituent components (e.g., services that make up the software product).

22 Claims, 14 Drawing Sheets

(56) References Cited

U.S. PATENT DOCUMENTS

2020/0319982 A1* 10/2020 Rusev ................. G06F 11/2097
2022/0255821 A1* 8/2022 Yousouf .............. H04L 41/0668

OTHER PUBLICATIONS

"Disaster Recovery of On-Premises Applications to AWS," AWS Whitepaper, Amazon Web Services, Inc., Jan. 19, 2022, 30 pages.
"Disaster Recovery of Workloads on AWS: Recovery in the Cloud," AWS Well-Architected Framework, Amazon Web Services, Inc., Feb. 12, 2021, 33 pages.

* cited by examiner

Storing, by a cloud computing system distributed across a plurality of computing regions, a set of two or more software entities in a first of the plurality of computing regions that have subscribed to receive regional failure notifications for the first computing region, the two or more software entities in the set being executable to perform any respective recovery routines needed to fail over from the first computing region to a different one of the plurality of computing regions
910

Receiving, by the cloud computer system, an indication of a regional failure for the first computing region
920

Publishing, by the cloud computer system to the set of software entities, a regional failure notification for the regional failure, wherein, after the publishing, the set of software entities perform any respective recovery routines to fail over to the different computing region
930

FIG. 9

CROSS-REGION SOFTWARE FAILURE RECOVERY

BACKGROUND

Technical Field

This disclosure relates generally to computer systems and, more specifically, to various mechanisms for cross-region software failure recovery.

Description of the Related Art

Current software products can be extremely complex. For example, many such products are microservices-based, which means the software is composed of small independent services that communicate over specified APIs. Microservices architectures can make applications easier to scale and faster to develop, enabling innovation and accelerating time-to-market for new features. For example, a sales-related software product may depend on services such as a database to store the names of potential buyers and an email server to manage communication to those buyers. Furthermore, the email server may, in turn, be dependent on other services, such as those relating to security and privacy. In some cases, a given software product may be composed of thousands of software services.

Software products, particularly cloud-based products, are frequently hosted in multiple geographic regions around the world. Performance is one factor driving such implementations, as multiple regions can reduce latency by eliminating the overhead of long network hops. Compliance can also be a major driver of multi-regional implementations, as data privacy regulations such as General Data Protection Regulation (GDPR) requirements will often impose restrictions that can only be successfully addressed through some flavor of a multi-region strategy. Still further, data access patterns and general usage models for some applications make housing a software solution in a single region challenging.

BRIEF DESCRIPTION OF THE DRAWINGS

FIG. 9 is a flow diagram illustrating an exemplary cross-region failure recovery performed by a cloud computing system, according to some embodiments.

DETAILED DESCRIPTION

Figure 1:
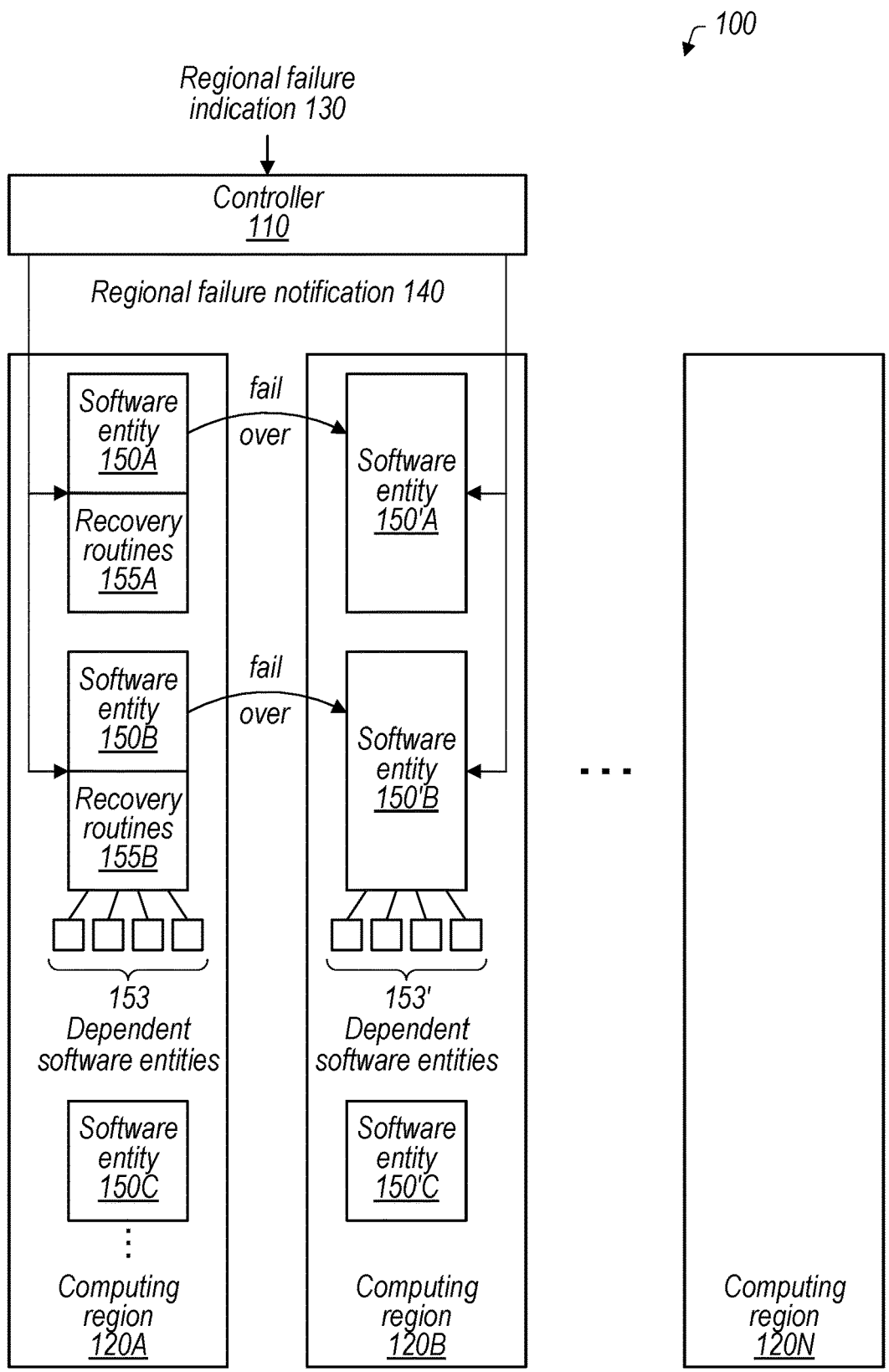
FIG. 1 is a block diagram of one embodiment of a computer system that performs cross-region regional failure recovery for software entities.

Cloud computing platforms (e.g., Amazon Web Services®) provide on-demand infrastructure (e.g., computing resources, storage resources, etc.) to clients that enables them to deploy software products that can be accessed by users of those clients, without the client having to actively manage the infrastructure. As used herein, a "software product" refers to any collection of one or more software modules, and may be comprised of multiple software services (which may be used by multiple software products). A "module," as used herein, refers to a set of software program instructions. Part of the appeal of cloud computing platforms is their ability to support a very large number of software entities due to their versatility and capacity. This ability allows clients to build their own software product of arbitrary complexity, with a single software product (e.g., a customer relationship management (CRM) platform) potentially comprising hundreds of other software services (e.g., a web server, a database server, a storage server, etc.). Cloud computing platforms typically provide usable infrastructure in different regions. The constituent software services of a larger software product are often deployed into one of those regions. But cloud computing platforms are susceptible to events (e.g., natural disasters) that can cause disruptions that affect the availability of the software products that are deployed on the infrastructure of a region. In such cases, it may be desirable to perform failure recovery to transition or "fail over" software products to a different region unaffected by the event. For example, in the event of a predicted natural disaster (e.g., flash floods) in a certain region, it may be desirable for a software product to fail over and operate in a different region so that it can continue to be available to users and other software.

Traditionally, software failover was performed at the server level: a given server backs up its image and then uses it when recovery is needed. Thus, in the event of a regional failure, a new server is launched in a different computing region and then configured to run the backed-up server image. But the existence of interdependent software entities makes such traditional cloud management techniques less effective because various related software entities may be located on different physical servers. Thus, during a failure recovery, the connections between dependent software entities can be severed when their corresponding servers are independently failed over without consideration of the software entities.

Another problem is that software products are not monolithic executables but can be composed of multiple software services developed by different developer teams. Each software service can have its own requirements for failover and thus different operations can be involved in a given software service's regional failure recovery. Further, failing over a software product can involve failing over its constituent services in a timely manner and thus it may be desirable to orchestrate the regional failure recovery such that at least a subset of those services is failed over in parallel. The traditional server-level approach does not provide a central management mechanism that can interact with the different software services of a software product to ensure that they collectively fail over to the target region.

The inventors realized that an architecture that decentralizes management of the failover recovery process can be beneficial. The solution also notifies software entities of regional failure, activates regional failure recovery measures, and provides general guidelines for regional failure recovery. In return, software entity development teams use the provided features to develop their own regional recovery procedures and send relevant information to the architecture. This architecture therefore allows the scalable recovery of software entities that may have dependencies.

FIG. 1 is a block diagram of a multi-region computing system 100. As shown, system 100 includes a controller 110 and computing regions 120A-N. Computing region 120A is shown as having software entities 150A-C, while computing region 120B is shown as having corresponding software entities 150'A-B.

Software entities 150 are software operating in a computing environment. A "software entity" is any collection of one or more software modules (e.g., databases, functions, executable applications, services). A software entity can be a single module (e.g., a single software service) or a more complex software entity that depends on other modules (e.g., a software product). For example, both a database and a database management system that stores and modifies database information are software entities, despite the difference in the number of their constituent modules. The individual modules of a software entity may be developed by different entities. For example, the database management system may include a query planner module developed by a first development team, a query optimizer module developed by a second development team, and a log manager module developed by a third development team.

Different regions 120 may have software entities that correspond to one another. For example, entities 150A and 150'A might each provide a login service for a particular software platform. Entity 150A might provide this service for the Western United States, while entity 150'A might provide this same service for the Eastern United States. As will be described below, in the event of a failure of computing region 120, entity 150A can fail over to entity 150'A. In such a scenario, entity 150'A, after the failure of region 120A, might handle logins from the entire United States. In other embodiments, an entity 150' in a second computing region might be instantiated in response to a notification of a failover in order to handle tasks previously performed by a corresponding entity 150.

Computing regions 120A-N provide the resources for software entities 150 and 150' to operate. A "computing region" is a collection of computing resources (e.g., servers, CPUs, GPUs, FPGAs) that are managed as a whole. In some cases, a region is understood to service users within a geographic area corresponding to that region. Thus, for example, one computing region 120 might be used to service users in North America, while another is used to service users in South America. But in other cases, computing regions 120 serve a specific type of software entity 150 instead. For example, a computing region 120 may host only databases.

Because computing regions 120 are comprised of computing resources that can be subject to software and hardware failures, operating in computing regions 120 introduces the possibility of a failure of those computing regions. A "regional failure" can be declared under a variety of circumstances, such as if a substantial portion of the resources within a given computing region 120 are likely to fail or have already failed. In some cases, a regional failure might be caused by various disaster events, such as hurricanes, tornados, tsunamis, earthquakes (potentially greater than some threshold), or heatwaves. In some cases, a regional failure may be indicated when some threshold number (e.g., 20%) of computer servers in the region have failed or are on the cusp of failing. In other cases, a regional failure may be caused by the failure of software services that have ubiquitous dependencies within the region—i.e., they affect many other services in the region. For example, such a service might cause a regional failure if that service is struck by a software bug if the Elastic Block Store (EBS) write latency for a storage volume rises excessively (e.g., 10 seconds), etc. When such a regional failure occurs for computing region 120A, it is desirable for software entities 150 to fail over from computing region 120A to a different computing region 120B-N that will execute corresponding software entities 150'. But in other embodiments, software entities 150' exist prior to the regional failure, and failover from a software entity 150A-N to another software entity 150'A-N accordingly consists of rerouting traffic from software entities 150A-N to respective software entities 150'A-N. This scenario is further discussed with respect to FIG. 8.

As discussed, software entities 150 may be varied in type and implementation and may each be composed of a unique set of modules. While this diversity of software entities 150 can allow for a limitless number of features to be provided to users, it can also increase the complexity of managing those software entities 150. In the event of a regional failure in the disclosed paradigm, a software entity 150 will account for all of its constituent modules when failing over to another computing region 120.

The recovery routines 155 that are executed to fail over from one computing region 120A to another computing region 120B generally follow similar high-level processes despite differences in the specifics of such processes for each software entity 150. As a result, providing "templates" for such recovery routines 155 can enable a software entity 150 to implement recovery routines 155 according to its needs while still following general procedures. This template may be provided by an API hosted by controller 110. In various embodiments, controller 110 provides each software entity 150 with a set of recovery routine specifications, as will be discussed in more detail with respect to FIGS. 2-3.

Given that software entities 150 may be diverse in their functionality and implementation, each software entity 150A-C may have its own configuration and thus its own set of recovery routines 155. For instance, the previously mentioned database and database management system might each have their own set of recovery routines 155 that fits their demands. For example, recovery routines 155 for the database might only recover the database itself, while recovery routines 155 for the database management system might recover all of the constituent software modules in the software entity. This can be seen in the differences between the recoveries of each software entity 150 in computing region 120A. As shown, software entity 150A possesses recovery routines 155A that enable it to fail over from the first computing region 120A to software entity 150'A located in computing region 120B. Recovery routines 155 may consider the specific architecture of its corresponding software entity 150 to improve the recovery process. For example, as shown, software entity 150B depends on other software entities 153 to facilitate its operation. Accordingly, recovery routines 155 for software entity 150B do not only fail over software entity 150B to its corresponding software entity 150'B, but they also fail over all services that software entity 150B depends on (e.g., by failing over entities 153 to 153').

Note that not all software entities 150 may need recovery routines 155 (e.g., software entity 150C). This may occur, for example, when a software entity is stateless and stores no state data: failing over for such a software entity may involve only rerouting traffic from computing region 120A to a software entity 150'C in computing region 120B without the need for any fail over operation. Various software entity architectures, including those that do not need recovery routines 155, are discussed in more detail with respect to FIG. 8.

Controller 110 is a generic name assigned to several different functionalities that are provided by computing system 100 for cross-region failure recovery. Controller 110 can thus be said to represent a failure recovery "framework" or "platform" for software entities 150 in computing regions 120. Various possible components of controller 110 are described throughout this disclosure, including with respect to FIG. 2.

Figure 2:
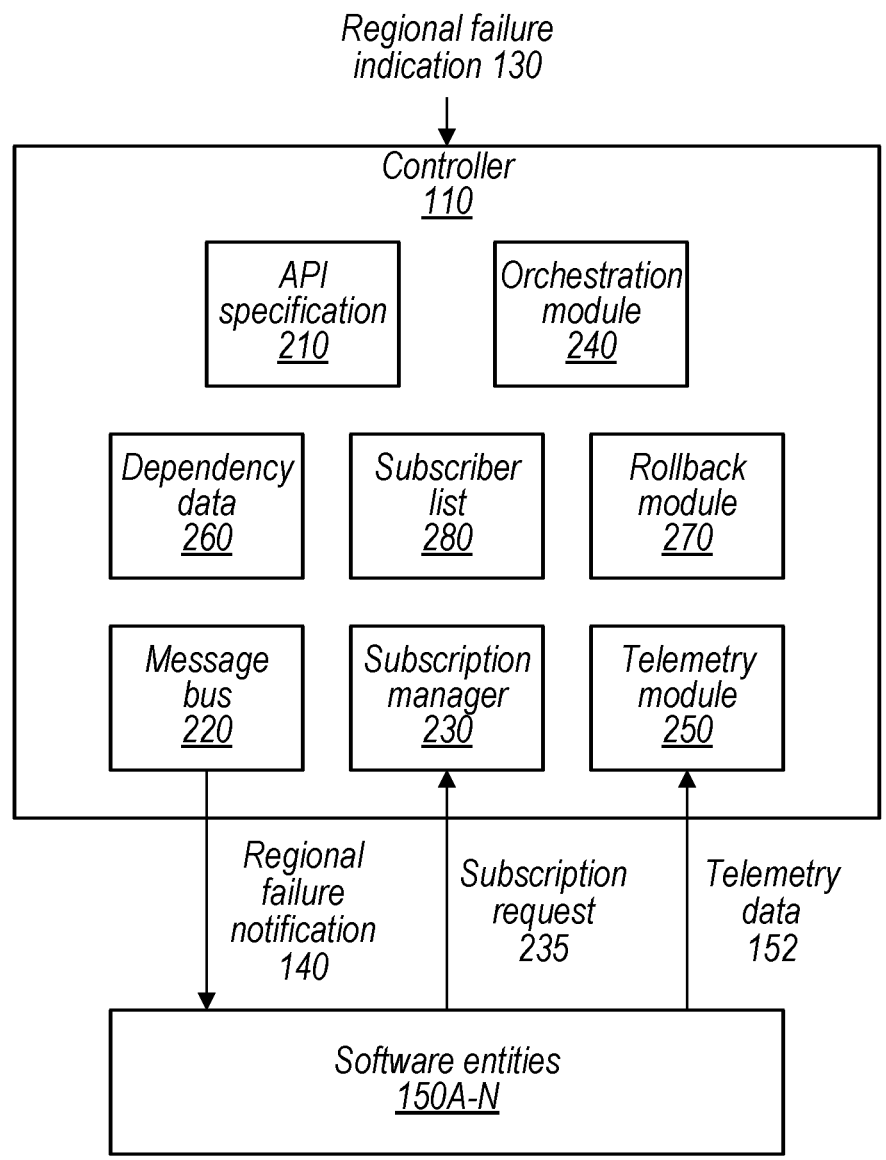
FIG. 2 is a block diagram illustrating example elements of one embodiment of a regional failure recovery controller.
Figure 4A:
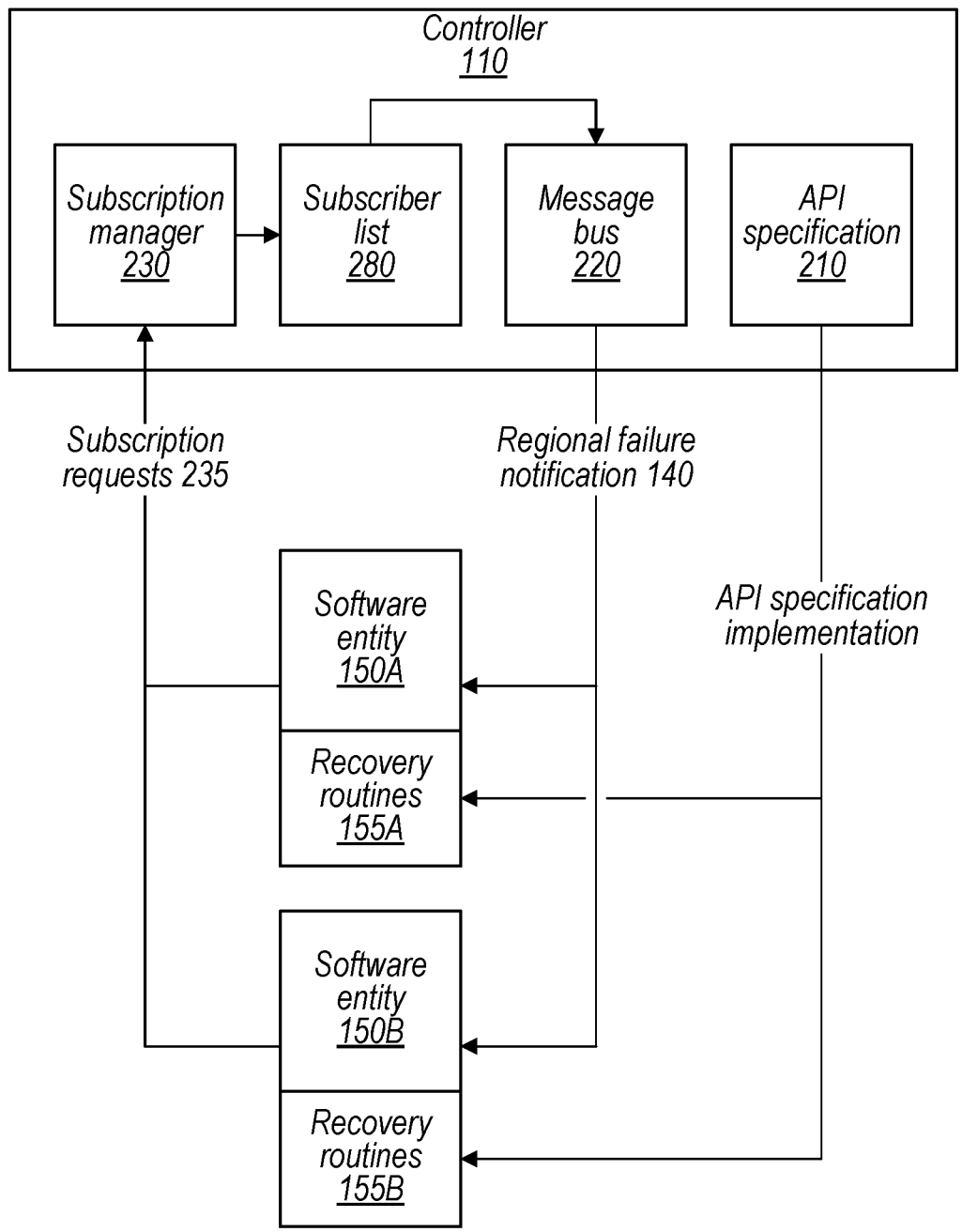
FIG. 4A is a block diagram illustrating one embodiment of a publisher-subscriber model implemented by a regional failure recovery controller and a set of software entities.

In various embodiments, controller 110 orchestrates the failure recovery process using a publish-subscribe model, discussed in more detail with respect to FIGS. 2 and 4A. In particular, software entities 150 that wish to be notified about a regional failure indication 130 may subscribe to controller 110. Through subscriptions by software entities 150, controller 110 is informed of the presence of the software entities 150 and is capable of tracking them. This tracking of software entities 150 is discussed with respect to FIG. 4A. In response to receiving regional failure indication 130, regional failure notification 140 is published (or caused to be published) by controller 110 to the subscribing software entities 150.

In various embodiments, controller 110 receives a regional failure indication 130 in the event of a predicted or detected regional failure. A regional failure can include, for example, a physical disaster that damaged servers functioning in computing region 120A, which causes the need for a failover to one of the other computing regions 120B-N. In some embodiments, regional failure indication 130 is initiated by a system administrator with access to controller 110. In other embodiments, regional failure indication 130 is automatically initiated by another entity (e.g., hardware sensors in computing region 120). In some embodiments, controller 110 automatically detects a regional failure (instead of receiving a regional failure indication 130) and subsequently publishes regional failure notification 140.

In the illustrated embodiment, controller 110 receives a regional failure indication 130 for computing region 120A and subsequently publishes (or causes to be published) a regional failure notification 140. Once a software entity 150 in computing region 120A receives regional failure notification 140, that software entity initiates its recovery routines 155 to fail over from computing region 120A to computing region 120B (or any other desired region 120).

Similarly, software entities 150' in other computing regions 120 may also receive regional failure notification 140. In some embodiments, all computing regions 120 might receive failure notifications for all regions. In such cases, notification 140 might include information indicating the source computing region (i.e., the one with the failure) and the destination computing region (i.e., the one to which the source computing region is to fail over to. Only those regions implicated would act on notification 140 (e.g., computing region 120N would not act on a notification 140 that implicates only regions 120A and 120B). In other embodiments, only those computing regions that are implicated in a particular failure are notified. Thus, regions 120A and 120B might receive a particular notification 140, while region 120N would not be notified.

Once a software entity 150 receives regional failure notification 140, it executes the recovery routines 155 as needed. These recovery routines may include a variety of functionalities such as checking the availability of the destination/target computing region 120, rerouting traffic from the failing computing region 120 to the target computing regions 120, and failing back to the former computing region once it becomes available again. Recovery routines can also be adapted to more complex software entities 150 that depend on other software entities 150 (e.g., software entity 150B depends on software entities 153). For example, a recovery routine of a given software entity 150 may initiate the recovery routines of other software entities 150 using, for example, API calls. As noted, certain software entities 150 do not need to failover in the event of a regional failure and therefore do not use recovery routines (e.g., software entity 150C).

The proposed failure recovery paradigm advantageously meets the demands of a software ecosystem having increased scale and complexity. Each software entity may consider its own needs and dependencies when implementing failure recovery measures, and system administrators do not need to orchestrate individual service-level recovery measures to ensure that dependencies are preserved. Instead, the system merely notifies the services of a failure, which then execute their own failure recovery functions that have been tailored to factor in any dependencies. As noted, this approach avoids using a single centralized entity for failure recovery management, as such an entity may be incapable of efficiently managing failure recovery at scale.

In various embodiments, multi-region computing system 100 is implemented using cloud infrastructure provided by a cloud provider. Thus, controller 110 and software entities 150 may execute on and utilize the available cloud resources of the cloud infrastructure (e.g., computing resources, storage resources, network resources, etc.) to facilitate their operation. As an example, a software entity 150 may be stored on a non-transitory computer-readable medium of server-based hardware included in a datacenter of the cloud provider and executed in a virtual machine that is hosted on that server-based hardware. Accordingly, failing over a given software entity 150 may include redeploying that software entity 150 to another virtual machine in a different computing region 120 of the cloud infrastructure. In some cases, a software entity 150 executes on a computing system of the cloud infrastructure without the assistance of a virtual machine or other particular deployment technologies, such as containerization. In some embodiments, components (e.g., controller 110) of multi-region computing system 100 are implemented using local or private infrastructure as opposed to a public cloud.

Turning now to FIG. 2, a block diagram of one embodiment of controller 110 is depicted. As discussed, while software entities 150 in a computing region 120 can have their own recovery routines 155, computing system 100 provides a framework or platform that includes code and data that helps control the failover process. As depicted, controller 110 includes an API specification 210, a message bus 220, a subscription manager 230, an orchestration module 240, a telemetry module 250, dependency data 260, a rollback module 270, and a subscriber list 280. In various embodiments, controller 110 can include different elements than those shown. Furthermore, in some implementations, various ones of the elements depicted in FIG. 2 may be combined in any suitable manner. For example, subscription manager 230 may be implemented as part of message bus 220.

As shown, controller 110 has various inputs and outputs. Controller 110 can receive subscription requests 235 from various software entities 150 in a computing region 120 and add those software entities 150 to subscriber list 280. When controller 110 receives regional failure indication 130, it can cause message bus 220 to publish regional failure notification 140 to all subscribing entities. During the recovery process, telemetry module 250 can receive telemetry data 152 reported by software entities 150 as to the status of the recovery process. A further description of the subscription and publishing features of controller 110 is provided with respect to FIG. 4A.

API specification 210 is a template that declares a standard set of routines that software entities can implement as recovery routines that facilitate their regional failure recovery. API specification 210 allows each service to implement its own recovery function while still having a standard for what functions are needed. For example, a recovery routine specification stored in API specification 210 may contain code that software entities can use to execute the failing over of a service from one computing region to another. In that case, any software entity 150 can implement the recovery routine specification and have the recovery routine implementation execute the failover. An example API specification is discussed in more detail with respect to FIG. 3, while implementing the specification is discussed in more detail with respect to FIG. 5B.

As discussed, subscription manager module 230 receives subscription requests 235 from software entities 150. A list of subscribing entities within a region 120 may thus be stored by controller 110 in subscriber list 280. This subscription paradigm allows the recovery framework of computing system 100 to have visibility into the set of software entities 150 that exist within a region 120. This visibility can be helpful given that the number of software entities 150 in computing region 120A may frequently change (and can be quite large).

Orchestration module 240, in various embodiments, controls and coordinates various other elements of controller 110 to effectuate the recovery process. For example, orchestration module 240 may cause regional failure notification 140 to be published such that subscribed entities 150 receive regional failure notification 140 via message bus 220, as shown with respect to FIG. 5A. Furthermore, orchestration module 240 includes instructions that involve initiating regional recovery in an order that preserves the dependencies between services. Thus, certain software entities 150 might have to wait for the set of entities 150 on which they depend to complete failing over first. Orchestration module 240 can also manage other aspects of the software entity recovery process such as rollback in case of a failure during the recovery process, which is discussed in more detail with respect to FIGS. 6-7.

Telemetry module 250, in various embodiments, tracks the status of the recovery process for software entities 150 involved in the failover. While software entities 150 implement their respective recovery routines 155, telemetry data 152 can be reported back to telemetry module 250. Telemetry data 152 includes information relating to software entities 150 as they fail over (e.g., estimated time remaining to finish recovery, estimated data remaining to recover, status of the failover operation). This data in telemetry module 250 is accordingly used by orchestration module 240 when managing the failover operations.

Dependency data 260, in various embodiments, is information about dependency relationships between software entities 150. In some embodiments, orchestration module 240 uses dependency data 260 to ensure dependencies are preserved during recovery by initiating regional recovery in the correct order. In some embodiments, dependency data 260 is generated by controller 110 using data sent by software entities (e.g., software entity 150B). The use of dependency data 260 to preserve dependency relations will be described in more detail with respect to FIGS. 6 and 7A-B.

Rollback module 270, in various embodiments, handles the rollback of software entities 150 during failures in the regional failure recovery process. In the event of an issue during the regional failure recovery process, rollback module 270 assists orchestration module 240 in the rollback process, which might include restoring a software entity 150 in the target computing region 120 to a previous state. Rollback procedures using rollback module 270 are described in greater detail with respect to FIG. 5C.

Figure 3:
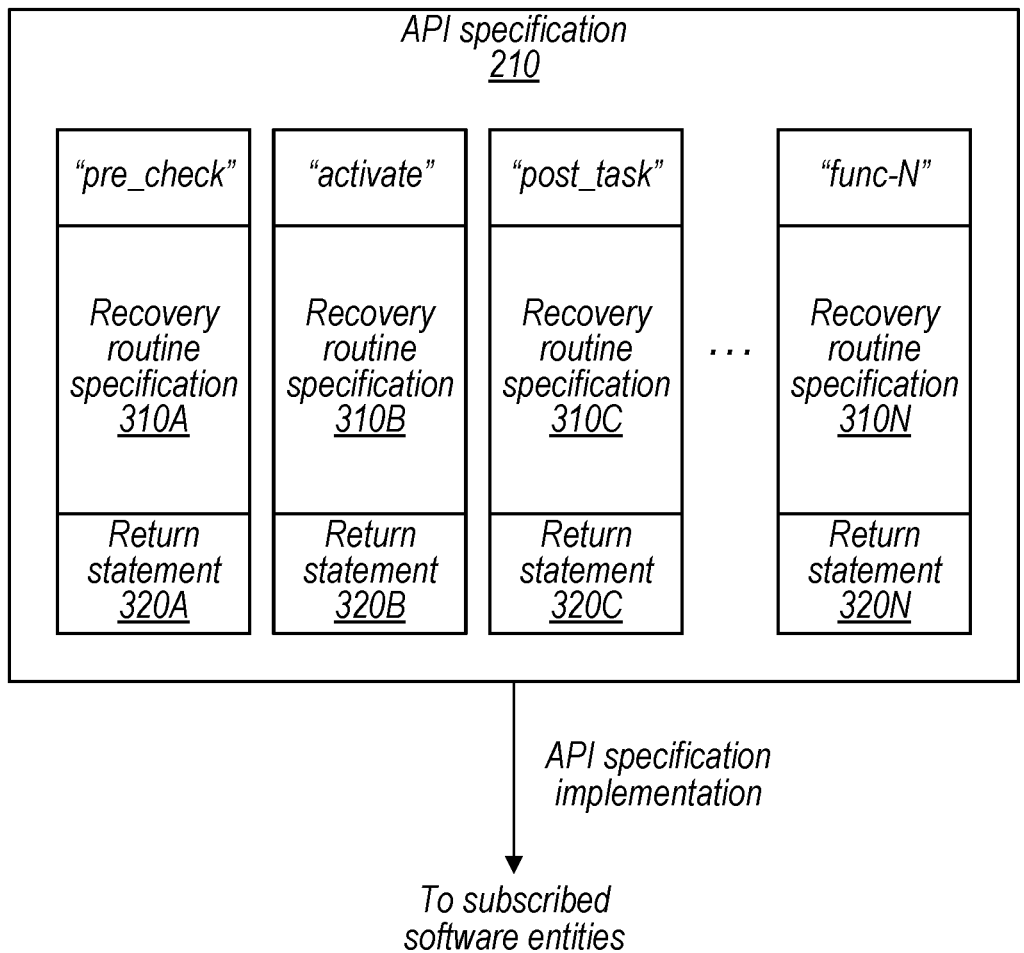
FIG. 3 is a block diagram illustrating example elements of one embodiment of an API providing regional failure recovery routines.

Turning now to FIG. 3, one embodiment of API specification 210 is depicted. In the illustrated embodiment, API specification 210 includes a set of recovery routine specifications 310A-N usable by software entities 150 to implement their respective recovery routines 155. API specification 210 can be implemented differently than shown. For example, API specification 210 may include an additional recovery routine specification for specifying rollback procedures to roll back a recovery procedure in the event of a failure during the failover. In other embodiments, API specification 210 might not include pre-check recovery routine specification 310A.

API specification 210 is used to provide prototypes for various recovery routines 155 that software entities 150 can use during various steps in the recovery process. API specification 210 is comprised of routine specifications 310, which act as blueprints written in a programming language (e.g., C++) that each software entity 150 implements as recovery routines 155. "Implementing" of a routine specification 310 can be described as using (at least in part) the code and parameters of routine specification 310 as a software entity's recovery routines 155 for regional failure recovery. Routine specifications 310 may include parameters that assist controller 110 in executing proper failure recovery for the software entity 150 implementing the routine, as failure recovery for individual software entities 150 can vary depending on the type of software entity 150. Furthermore, as shown, routine specifications 310A-N include respective return statements 320A-N that return information reflecting the status of the recovery process for the software entity 150. Return statements 320 may thus be used to send telemetry data 152 to controller 110.

Routine specifications 310 provide many advantages for the software entities 150 that implement them. These specifications allow development teams to implement certain aspects of the recovery routines without having to recode those portions themselves. Instead of having each software entity development team write its own detailed code that implements all the steps of failure recovery, controller 110 may instead provide the software entities 150 with pre-existing recovery routine specifications 310. Furthermore, routine specifications 310 standardize the failure recovery process by having each software entity 150 implement and follow the same general steps of the failure recovery procedure.

As previously discussed, routine specifications 310 provide entities with the code necessary to implement the steps of the regional failure recovery process. API specification 210 may include additional routine specifications not described in the present disclosure. For example, an additional routine specification 310 may be introduced to handle failures during the regional recovery process by executing steps of a rollback procedure. FIG. 3 shows examples of three common routine specifications that software entities 150 may implement.

Routine specification 310A is for a "pre-check" routine. This routine ensures that the software entity is properly prepared to fail over from a first computing region to a second computing region by executing tasks such as checking whether the second computing region is available. The code can instantiate some of the parameters needed to implement pre-checking. For example, source_region and target_region (shown below) can be used to describe the first and second computing regions 120, respectively. Other identifiers (e.g., "product," "service," and "cell") of the software entity may assist controller 110 in the recovery process. For example, "service" can describe the functionality of the software entity 150, allowing controller 110 to implement the appropriate pre-check procedure, as the pre-checking procedure for a database is different from pre-checking for a function.

```
service.pre_check(
source_region=>"region1"
target_region=>"region2"
product=>"CRM"
service=>"db"
cell=>"cell1"
current_time=>"current_timestamp"
api_version=>"v1.0"
) Return (
DR_readiness=>"healthy"
est_RPO=>"0 min"
est_RTO=>"1 min"
status_code=>"success"
)
```

Having code in this format allows for the use of the input parameters (e.g., "source_region," "target_region," "api_version") of an API routine to assist in the software recovery process: the input parameters can be used by controller 110 during regional failure recovery. In some embodiments, controller 110 can use the values of "source_region" and "target_region" input parameters to check the availability of "region2" and ensure that it is available as the destination of the failover software entity of "service."

Then, after a software entity 150 completes its "pre_check" routine, it returns the values defined in the "Return" portion of the code example, which map to return statement 320A. The statement implementation shown above includes an "est_RPO" variable that contains the estimated time remaining to reach a particular Recovery Point Objective (RPO), the time to completely transfer data from a first to a second computing region. Similarly, the "est_RTO" variable estimates a particular Recovery Time Objective (RTO), the time required for the software entity to be available to users again. Note that these two objectives have two different estimated values, as a software entity 150 may be available to users before its data is fully recovered. "DR_readiness" returns whether a software entity 150 is ready to fail over from one computing region 120 to another, while "status_code" reflects the status of the pre_checking function, which is "success," as the routine has presumably reached completion once it has finished executing.

After a recovery routine is completed, its returned variables are sent to controller 110, which then uses received values to further manage and monitor the recovery. For example, it may use the Recovery Point Objective (RPO) and Recovery Time Objective (RTO) estimates to determine whether a timeout needs to be declared. Software entities 150 may implement routine specification 310B with the same parameters given above or using their own parameters. For example, a function service may have a parameter "service=>"function", as opposed to a database service, which would have the value "service=>"db"" instead. Implementations of recovery routine specifications are discussed in more detail with respect to FIG. 5B.

Routine specification 310B is for an "activate" routine. This routine implements the functions that actually perform the failover to another computing region 120. The code below instantiates some of the parameters involved in executing the failover process of moving a software entity from one computing region to another.

```
service.activate(
source_region=>"region1"
target_region=>"region2"
product=>"CRM"
service=>"db"
cell=>"cell1"
current_time=>"current_timestamp"
api_version=>"v1.0"
) Return (
service_endpoint=>"endpoint2"
RPO=>"0 min"
status_code=>"success"
)
```

Routine 310C describes a "post_task" routine. This routine verifies that the software entity 150 failed over successfully and cleans up any artifacts that were used in the failover but are not part of the normal operation of the software entity 150.

```
service.post_task(
source_region=>"region1"
target_region=>"region2"
product=>"CRM"
service=>"db"
cell=>"cell1"
current_time=>"current_timestamp"
api_version=>"v1.0"
) Return (
status_code=>"success"
)
```

Routine specifications 310A-C may of course be implemented differently. Routine specification 310C might, for example, include a checksum procedure to check the integrity of software entity data and ensure no data has been corrupted in the recovery process. As another example, routine specification 310A may include an overall status indicator that allows controller 110 to know that a software entity 150 is ready for fail over. Such implementations are discussed in more detail with respect to FIG. 5B.

The API can be further used as an enforcement mechanism to ensure that subscribed software entities 150 comply with regional failure recovery standards. In some embodiments controller 110 may ensure that the routines are properly implemented in a software entity 150 by executing them in a testing environment. For example, controller 110 may use subscriber list 280 and call all of the subscribed software entities' recovery routines 155 as a test. If one of the called recovery routines 155 fails during execution or returns an error before executing (e.g., "the routine does not exist"), the administrator of system 100 sends a message to the development team of the culpable software entity 150 and requires the correct implementation of one or more of recovery routine specifications 310A-N.

Turning now to FIG. 4A, a block diagram illustrating an interaction between software entities 150A-B and controller 110 is shown. Controller 110 uses API specification 210, message bus 220, subscriber list 280, and subscription manager 230 to manage communication and setup of regional failure recovery of software entities 150 and their recovery routines 155.

In the illustrated embodiment, software entities 150A-B send subscription requests 235 to subscription manager 230. Then, subscription manager 230 generates a subscriber list 280, which is subsequently used in message bus 220 to send regional failure notification 140. To further enable regional failure recovery, the development team of software entities 150A-B can implement code as needed from API specification 210 in the form of recovery routines 155A-B.

The communication between controller 110 and software entities 150 may be facilitated using a publisher-subscriber model that is implemented, in part, by subscription manager 230. Subscription manager 230 receives subscription requests 235 from software entities 150A-B. Subscription requests 235 can be in any suitable format (e.g., HTTP request, API call, file upload, etc.).

Information from subscription manager 230 is then used to generate subscriber list 280, which is then used by message bus 220 to send regional failure notification 140 to the subscribed software entities. Subscriber list 280 may be implemented using any suitable data structure that enables the functionality of controller 110—one such embodiment is described in more detail with respect to FIG. 4B.

Message bus 220 sends regional failure notification 140 to subscribed software entities 150. In some embodiments, message bus 220 sends regional failure notification 140 after controller 110 receives regional failure indication 130. Message bus 220 may communicate with software entities using any suitable format. Upon receipt of regional failure notification 140, software entities 150A-B may execute recovery routines 155A-B, respectively, to initiate the recovery process. In some embodiments, regional failure notification 140 causes the set of software entities 150 to perform any required pre-recovery processing routines before failing. For example, regional failure notification 140 may call a "pre_check" routine that ensures that the destination computing region 120 is capable of hosting additional software entities 150. Two example procedures for regional recovery will be discussed in more detail with respect to FIGS. 6 and 7A-B.

Using a subscription manager to track software entities that need recovery makes the failure recovery process more scalable. Instead of having to manually discover and track each individual software entity in a given computing region, the inventors realized that they could have software entities subscribe to various functionalities that facilitate regional failure recovery. Shifting the burden from a central authority to the software entities 150 allows the infrastructure provider to avoid having to discover the identity of all software entities 150 within a region 120.

Figure 4B:
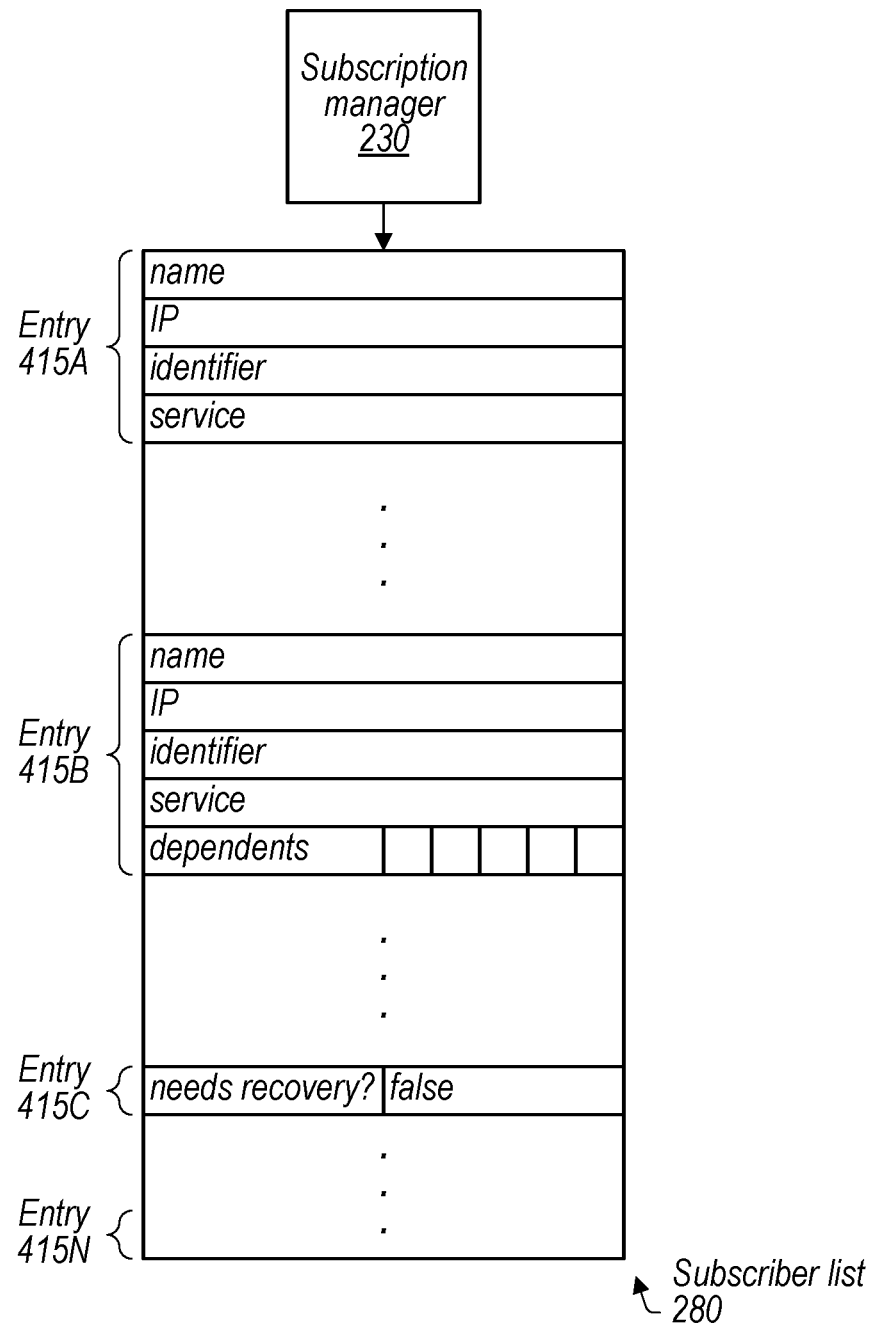
FIG. 4B is a block diagram illustrating an example format of a subscriber list for a set of software entities.

Turning now to FIG. 4B, an embodiment of a subscriber list 280 is shown. Subscriber list is compiled by controller 110 using information sent by subscription manager 230. Subscriber list 280 may be in any format capable of storing and classifying information indexed by software entities (e.g., JSON, Python dictionary, OOP array). In the illustrated embodiment, subscriber list 280 includes entries 415A-N. As shown, entries 415A-B respectively include a name, an Internet Protocol (IP) address, a software entity identifier, and service identifier. As further shown, entry 415B identifies constituent software entities 150 (referred to as "dependents") of the software entity 150 of entry 415B. Subscriber list 280 also includes entries such as entry 415C for software entities (e.g., software entity 150C) that do not need regional recovery; these entries include at least a Boolean indicating that the software entity does not need recovery. Entry 415C is automatically generated by subscription of a software entity such as entity 150C. But in other cases, entry 415C is manually entered by the administrator of controller 110.

Entries 415, in various embodiments, include information that enables controller 110 to manage subscribed entities. As shown for example, that information can include a name value which corresponds to a user-provided name applied to a software entity 150. Similarly, "identifier" may be used in routine calls as a way to identify the software entity (e.g., as a callable object or a parameter entered into an OOP routine). "IP" describes the IP address of the server that hosts the corresponding software entity 150, which can be used in pre-checking. "Service" describes the type of software entity (e.g., a function, a stateless service, a database), which may assist in applying specific regional recovery procedures that depend on the type of entity.

In some embodiments, subscriber list 280 is managed by one or more entities separate from subscription manager 230. For example, a human administrator of controller 110 may manually add a software entity 150 to subscriber list 280, even when such a software entity 150 has not subscribed to regional recovery events. This feature may be helpful, for example, in software entities 150 abandoned by their respective development teams but still being actively used by other software entities 150.

Figure 5A:
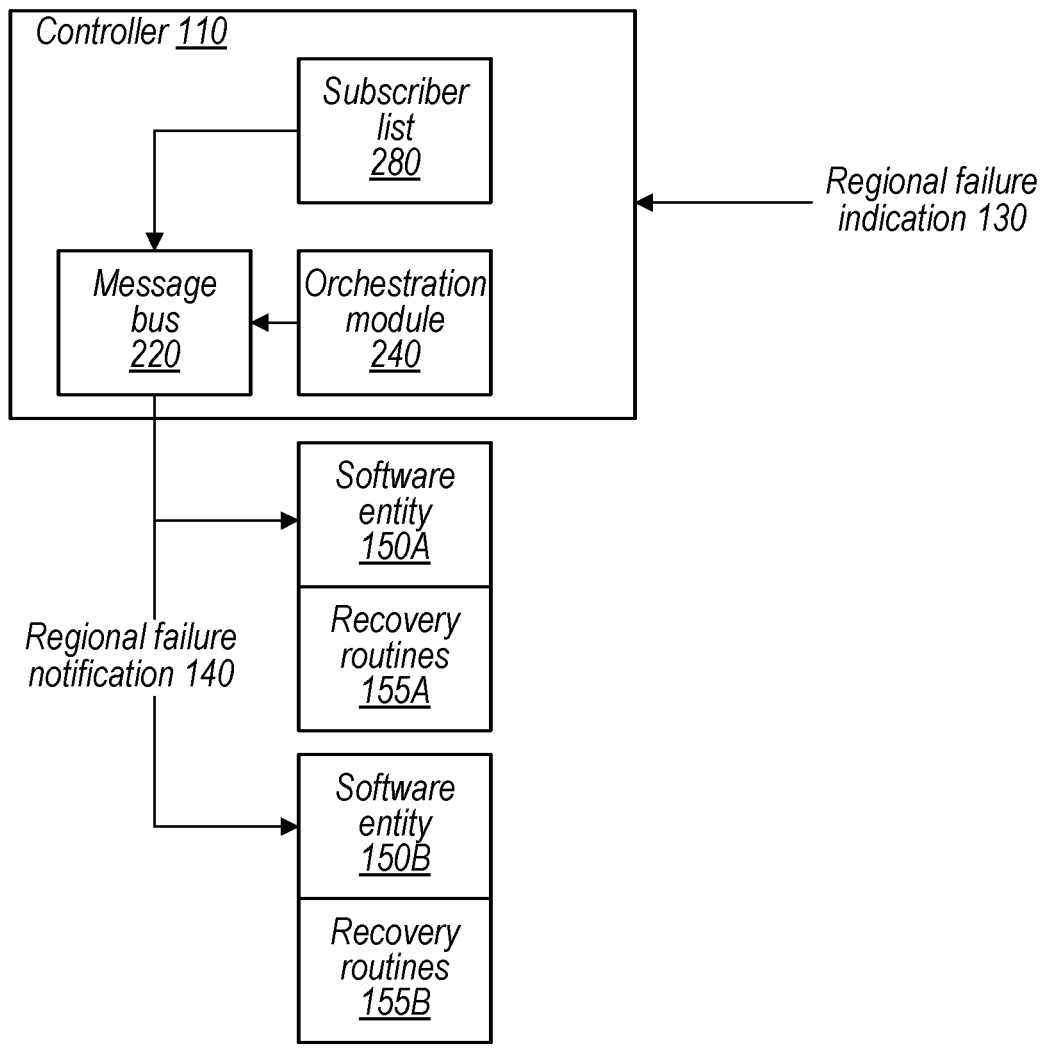
FIG. 5A is a block diagram illustrating one embodiment of the beginning of a regional failure recovery process.
Figure 5B:
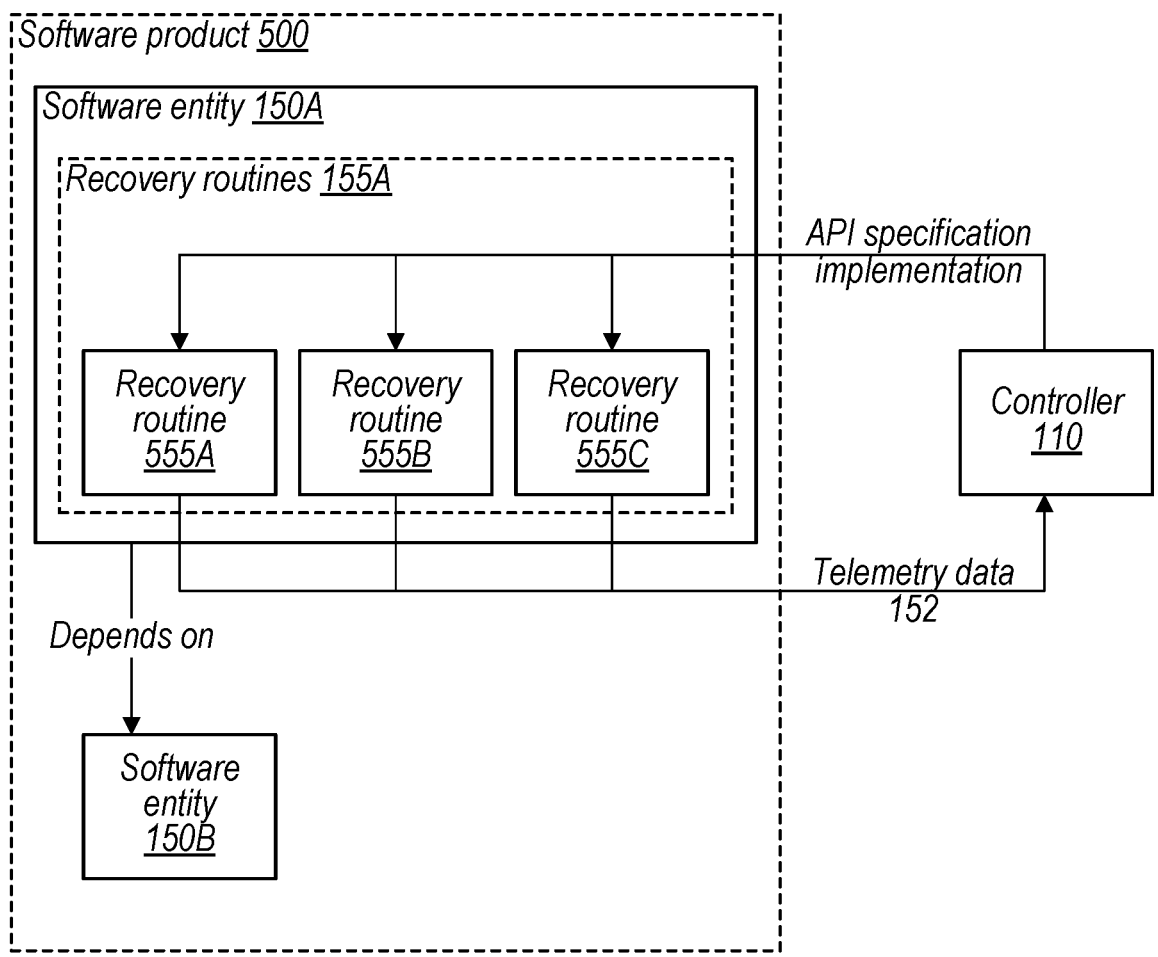
FIG. 5B is a block diagram illustrating one embodiment of example routines of a software entity.
Figure 5C:
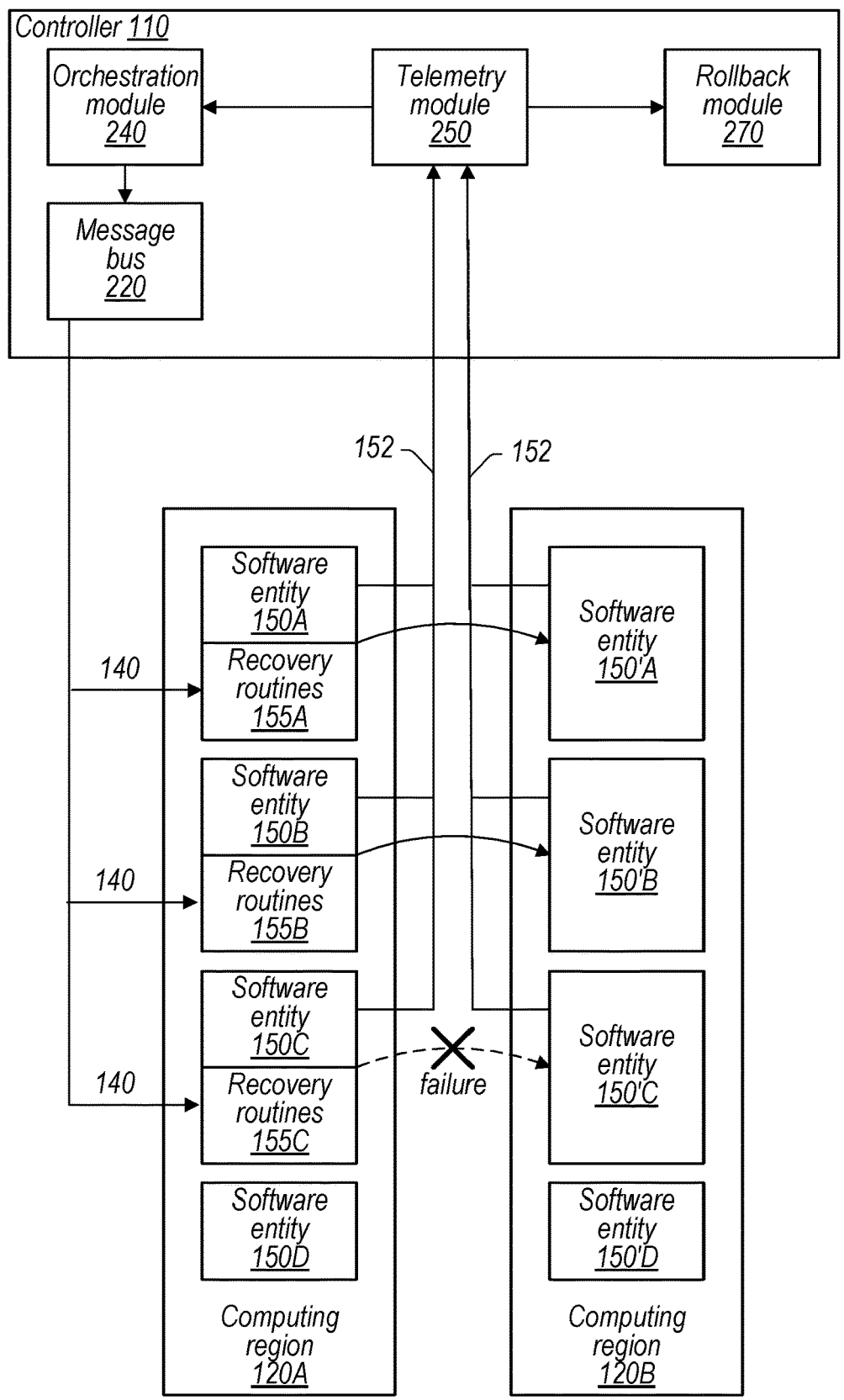
FIG. 5C is a block diagram illustrating example elements of a controller capable of managing regional failure recovery of software entities.

Once controller 110 receives regional failure indication 130 and sends regional failure notification 140 to software entities 150, the regional failure recovery process begins. FIGS. 5A-C describe the process of recovery by illustrating the various interactions between modules of controller 110 and software entities 150. FIG. 5A illustrates the beginning of the failure recovery process, FIG. 5B illustrates the components of software entities 150 with respect to failure recovery, and FIG. 5C illustrates the failing over of the software entities 150 from one computing region 120 to another.

Turning now to FIG. 5A, a block diagram illustrating an example regional failure recovery process is shown. As shown, controller 110 contains subscriber list 280, message bus 220, and orchestration module 240, and software entities 150A-B are associated with recovery routines 155A-B, respectively.

As discussed, orchestration module 240 can initiate a regional failover in response to receiving a regional failure indication 130. In various embodiments, message bus 220 uses subscriber list 280 and sends a regional failure notification 140 to initiate the regional recovery process. Regional failure notification 140, in various embodiments, triggers (e.g., via a routine call) the recovery routines 155 of a set of software entities 150. In many cases, orchestration module 240 implements multiple notifications for the different stages of the regional failover. For example, orchestration module 240 may trigger, via message bus 220, the set of software entities 150 to perform pre_check recovery routines by sending a "pre_check_event" to those software entities 150. In some embodiments, the triggering is done using a API call to one of the recovery routines 155 present in software entities 150 (e.g., pre_check, activate). More details regarding the contents of recovery routines 155 in the context of a software entity 150 are provided with respect to FIG. 5B.

Turning now to FIG. 5B, a block diagram of a software product 500 is shown. As shown, software product 500 includes a software entity 150A, which depends on another software entity 150B. The development team of software entity 150A implements recovery routines 155A as routines 555A-C, which send telemetry data 152 to controller 110.

Software entity 150A includes recovery routines 555A-C that implement routine specifications 310A-C using API specification 210, according to some embodiments. In some instances, specification implementation is accomplished by defining a software entity's routine using an additional keyword (e.g., "implements"). The keyword indicates to code parsers that a recovery routine 155 is an implementation of a previously defined routine specification 310 and not a newly defined routine.

These recovery routines 155 are capable of returning data to controller 110 as telemetry data 152. For example, a recovery routine 155 may be implemented to return the status of its parent entity to controller 110 to ensure that controller 110 responds appropriately in the event of a problem that occurred during the regional recovery process.

Recovery routine 555A, in the illustrated embodiment, is an instance of a "pre_check" routine. Routine 555A is tasked with preparing for a regional recovery and ensuring that its software entity 150 is ready to start the failover process. Example code for a "pre_check" routine for a database module is as follows:

```
check( ) implements service.pre_check {
db. check_lag( )
db.estimate_restore_time( )
}
```

In this instance, "check" is the name of recovery routine 555A. Note the use of the "implements" keyword, which informs compilers and virtual machines that recovery routine 555A is an implementation of recovery routine specification 310A (not shown). In this example, the implementation checks for any communication lag for a request from the source region that is rerouted to the target region, and estimate_restore_time( ) returns an estimation of how long the failure recovery process will take. Software entity 150A then executes recovery routine 555A and returns telemetry data 152 upon the routine's completion, indicating success or failure.

Routine 555A may additionally return various flags and variables that indicate the status of the pre-failure recovery process. In this case, the "Return" statement is an implementation of return statement 320A. An example return for 555A may be written as:

```
return {
DR_readiness
est_RPO
est_RTO
status_code
}
```

These returned parameters can be especially useful when sent as telemetry data 152: DR_readiness can assist in notifying controller 110 that the service is ready to failover, est_RPO (estimated recovery point objective), est_RTO (estimated recovery time objective) can inform of the estimated duration of the recovery process, and status_code can be used to update controller 110 with the status of the software entity during the recovery process (e.g., ready, started, failed).

Recovery routine 555B is an instance of an "activate" routine. Routine 555B performs the steps for a regional recovery failover operation. Below is example code for an "activate" routine for a database module:

```
db.switch_region( ) implements service.activate {
if (target_region is healthy) then db.stop(source_region)
db.failover(target_region)
db.health_check(target_region)
}
```

In the example, software entity 150A first stops operating in the source region if the target region is determined to be healthy, then fails over to the target region. After failover is complete, software entity 150A performs a health check to validate whether failover has been successful. Note that additional code may be added in other implementations (e.g., exception handling, telemetry parameter updates, etc.)

One of the advantages of using recovery routine specifications 310 is their ability to be implemented in different ways. If a software entity's development team wanted to change how it implements its "activate" routine, then it may write a different recovery routine 555B that meets its own requirements. For example, the development team may want to use a backup-restore implementation of a failover, where the failing over is from the original software entity in the first computing to a different backed up software entity in the target region:

```
db.switch_region(backup) implements service.activate {
db.restore(target_region, backup)
db.startup(target_region, "primary")
db.health_check(target_region)
}
```

In this example, a restored software entity is created in the target region using a backup software entity, then the restored software entity becomes the "primary" software entity: it now reads and writes data in the target region as opposed to serving as a backup/read-only before fail over occurred). Similar checks may also be added using the post_task routine provided by routine specification 310C, whose implementation 555C is discussed in the paragraph below.

Recovery routine 555C is an instance of a "post_task" routine. Routine 555C is tasked with ensuring the correct functioning of its software entity 150 in the target region and cleaning up any data left over from the recovery procedure that is not used in the functionality of the software entity. Example code is as follows:

```
db.reset( ) implements service.post_task {
db.start(source_region, "standby")
db.resync(target_region)
}
```

In this example, the software entity in the source region becomes the backed-up software entity (and receives no traffic) and is reconfigured to sync with the software entity in the target region as a backup software entity. More information regarding this specific pattern can be found with respect to software entity 840 in FIG. 8. As with routines 555A-B, recovery routine 555C may include additional functionality and return code for telemetry data 152.

As shown, software entity 150A depends on software entity 150B, which means that any recovery of software entity 150A needs to also recover software entity 150B. For example, software entity 150A may be a database management system that depends on a query parser 150B. Different ways of handling such dependencies when recovering software entities will be discussed with respect to FIGS. 6-7A-B.

As recovery routines 555A-C respectively implement specifications 310A-C, they are capable of providing to controller 110 information regarding the failover process. For example, routine 555A may include specific values for "source_region" and "target_region" as these two variables are parameters in 310A-C. In some embodiments, 555A may be implemented as follows:

```
check( ) implements service.pre check (
source_region=>"region1"
target_region=>"region2") {
db.check_lag( )
db.estimate_restore_timeo
}
```

The additional region information provided within the parentheses may be further used by controller 110 in some embodiments. For example, this information might allow controller 110 to determine what regions 120 are to receive a particular regional failure notification 140.

Turning now to FIG. 5C, various components of a regional failover recovery process are depicted. In the illustrated embodiment, controller 110 uses orchestration module 240 to manage recovery from a computing region 120A to a second computing region 120B. Telemetry data 152 is sent back to telemetry module 250 using returned data from recovery routines 155. Rollback module 270 may detect a failure during the recovery process from telemetry module 250, in which case it notifies orchestration module and initiates a rollback of software entities to their previous state.

Orchestration module 240 is tasked with managing the software entities' regional failure recovery using message bus 220. In some embodiments, 240 may be implemented as follows:

```
operation initiate is
    input: product_list p[ ],
        cell_list c[ ],
        source region r1,
        target region r2,
    publish("pre_check_event", input)
    publish("DR_event", input)
    validation_test( )
    update_customer routingo
    exceptions:
        If (status==failure) rollback;
    return: failover status
```

The example code written above is one example of a procedure orchestrating a failover for subscribed software entities. The failover procedure is defined as operation "initiate," which is called by orchestration module 240 once a regional failure indication 130 is received by controller 110. The operation takes subscriber list 280 in the form of product_list and cell_list, while source region r1 and target region r2 represent computing regions 120A and 120B respectively.

At the beginning of the operation, a "pre_check_event" is published using the "publish function" to trigger all subscribing software entities' "pre_check" routine implementations and ensure that the entities are ready to begin regional failure recovery. Then, a "DR_event" is published to subscribing software entities 150A-C, which corresponds to sending regional failure notification 140. After the publishing of regional failure notification 140, recovery routines 155A-C are called in an order that preserves their dependencies, which is discussed in more detail with respect to FIGS. 6-7.

After all software entity recovery routines conclude, controller 110 may want to implement its own checks to ensure the success of regional recovery and cleanup the data produced by the recovery, as evidenced by "validation_test( )," which tests the functionality of software entities and "update_customer_routing( )," which reroutes traffic from the first to the second computing region.

As expected with recovery routines, especially at the scale of software entities disclosed herein, some routines may fail. Orchestrator module 240 handles failures using common error handling constructs: the "exception" keyword is used to catch any failure in a given recovery routine. If a recovery failure routine occurs, then orchestration module 240 may communicate with rollback module 270 and initiate rollback procedures. Once orchestration by orchestration module 240 is completed, the status of the failover is returned to system 100 to notify the system of the conclusion of the recovery process. In some embodiments, orchestrator module 240 also triggers the "post_task" routine for all subscribed software entities by publishing a "post_task_event" via message bus 220. This publishing may be done to more rigorously ensure that failover has been successfully completed.

When a failure in the regional failure recovery process occurs, it may be desirable to implement procedures to handle the failure. As shown, a failure occurs in the regional failure process of software entity 150C, which attempts to failover to software entity 150'D but cannot do so to completion. In that case, an error is detected in either software entity 150D or 150'D using telemetry received from the software entity. In that case, rollback module 270 handles the rollback of 150D.

Rollback module 270 contains data that assists in the rollback process. In some embodiments, rollback module 270 uses various data backup and recovery methods to attempt to recover specific data and files related to software entities which were in the process of being failed over to a second computing region but were interrupted for various reasons.

The mechanics of a rollback operation may vary depending on the type of failure, its computing region 120, and at which step of the recovery process that the failure occurs. Examples of failures include failure to meet RPO/RTO objectives (i.e., a timeout), data corruption at either computing region 120, connectivity issues between computing regions 120, and software bugs or errors in recovery routines implementations 555 or specifications 310. In some embodiments, rollback involves creating a new software entity 150' in the same computing region 120B and restarting the regional recovery process. But in other embodiments, a software entity 150 is created in a third computing region different from 120A-B if the issue resided in computing region 120B.

Dependency Handling

Figure 6:
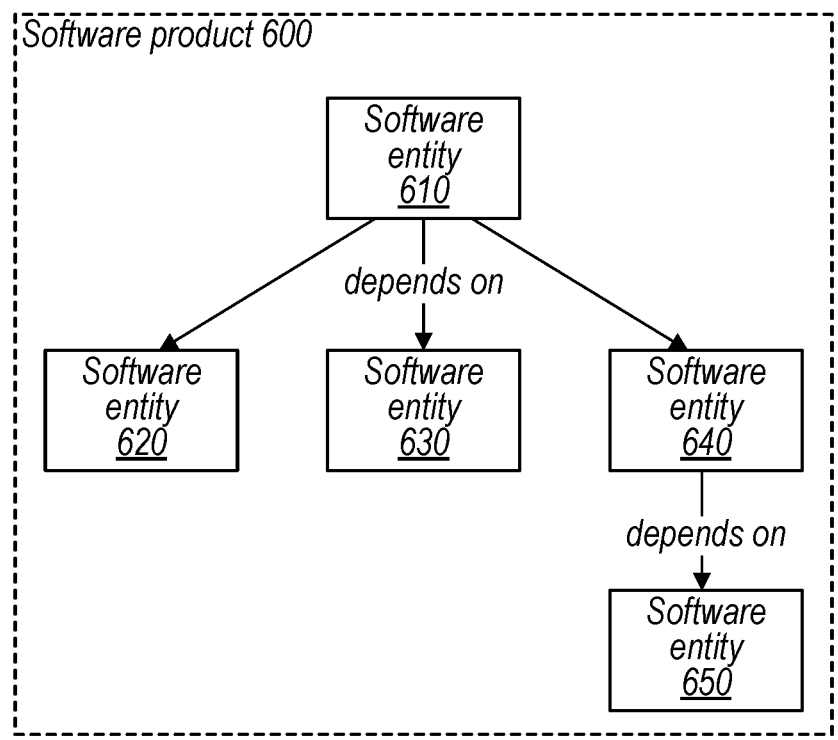
FIG. 6 is a block diagram illustrating an example hierarchy of software entities within a software product.

Turning now to FIG. 6, a block diagram of an example software product 600 is depicted. In the illustrated embodiment, software product 600 includes software entities 610, 620, 630, 640, and 650. As shown, software entity 610 has dependencies on software entities 620, 630 and 640, and software entity 640 is dependent on software entity 650. For example, software entity 610 may be a customer management service that depends on an email service 620, a calendar service 630, and a customer service function 640. Function 640 may in turn depend on a customer database system 650. A regional recovery process that preserves software entity dependencies, such as those depicted in FIG.

Figure 7A:
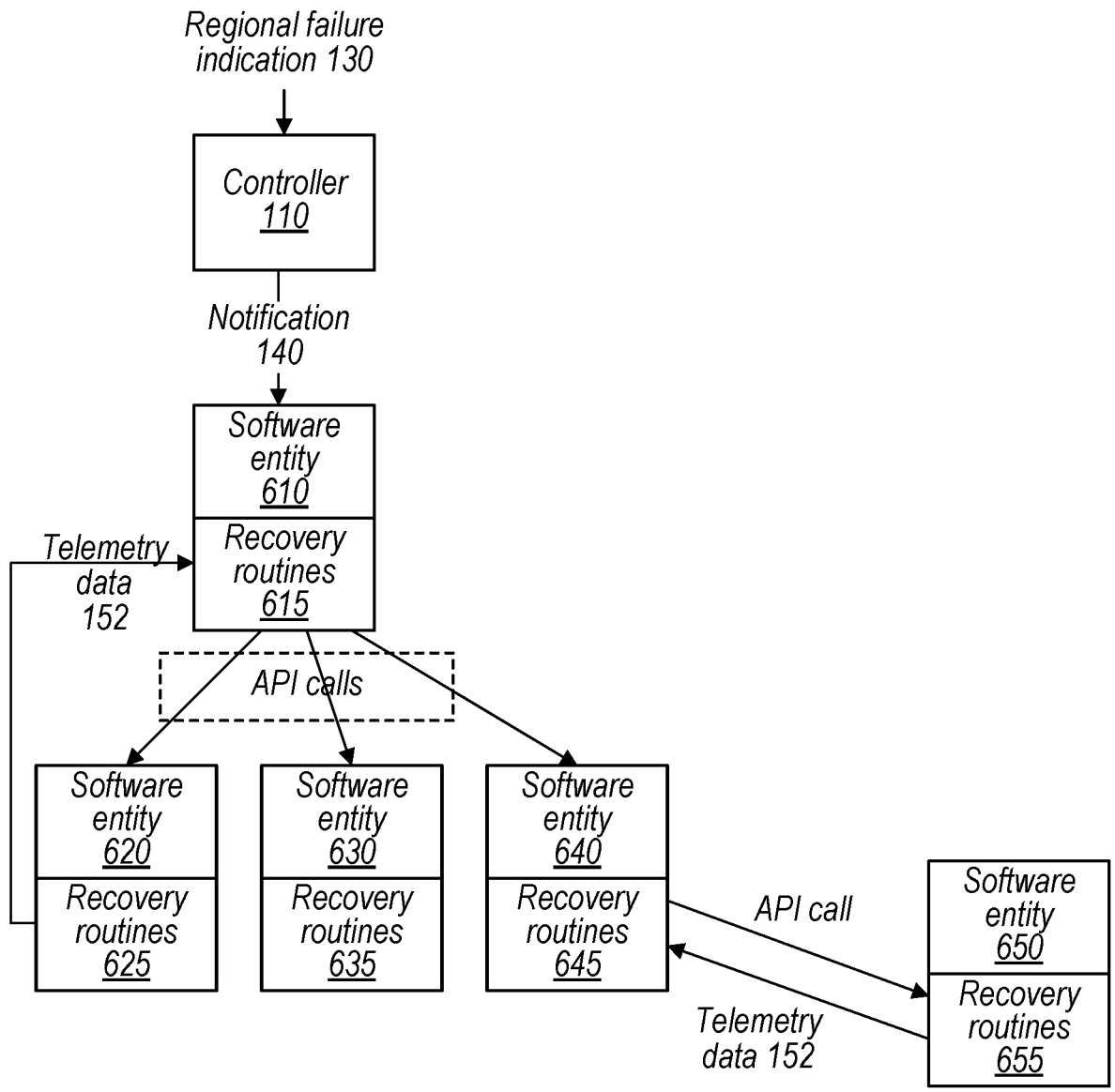
FIG. 7A is a block diagram illustrating example elements of regional failure recovery of software entities with dependencies.
Figure 7B:
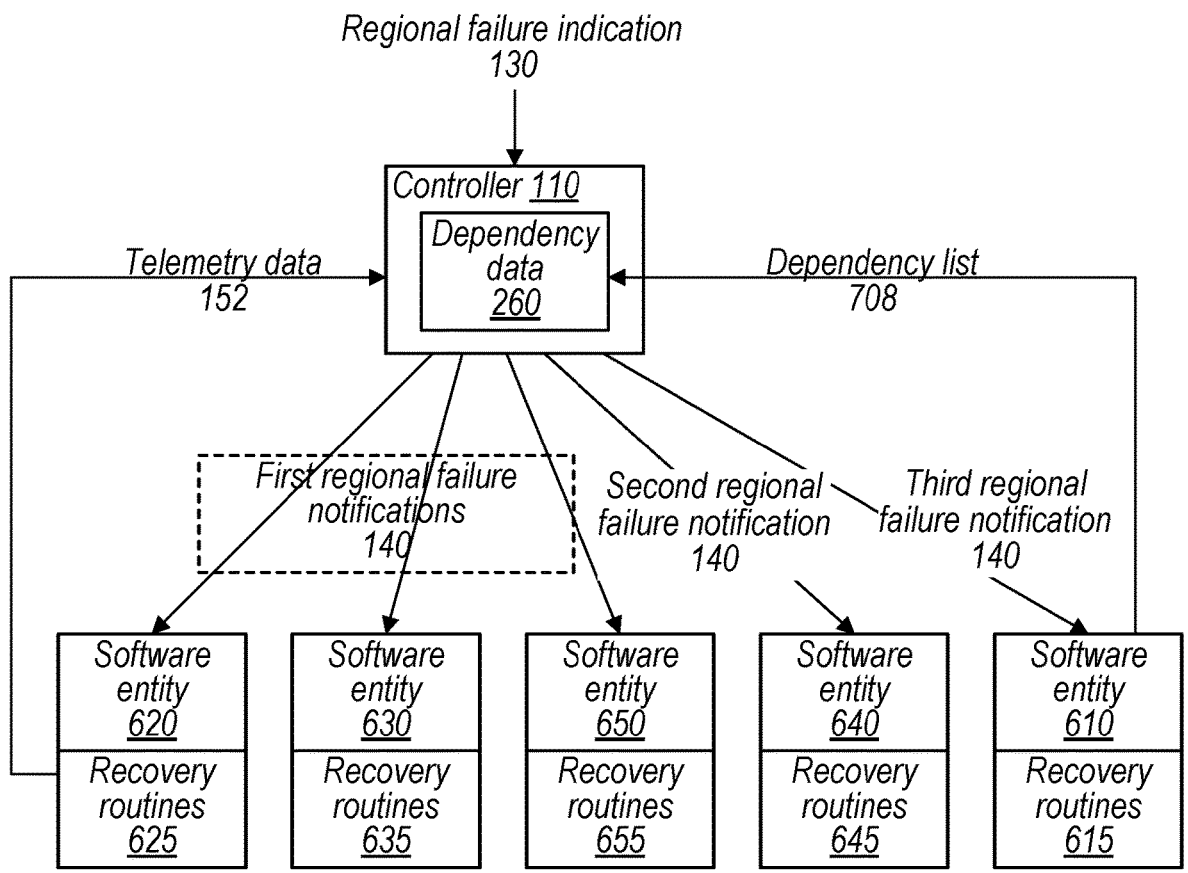
FIG. 7B is a block diagram illustrating example elements of an alternative regional failure recovery of software entities with dependencies.

6, may be implemented in a variety of ways, two of which are discussed with respect to FIGS. 7A-B.

Turning now to FIG. 7A, an embodiment of a regional recovery process is shown. In the illustrated embodiment, controller 110 sends a regional failure notification 140 to software entity 610. Software entity 610 uses recovery routines 615 to call dependent software entities 620, 630, and 640, and software entity 640 in turn uses recovery routines 645 to call dependent software entity 650. Telemetry data 152 is sent from the callee (e.g., recovery routines 625 and 655) to the caller (e.g., recovery routines 615 and 645).

Once software entity 610 receives regional failure notification 140 from controller 110, it initiates recovery routines 615. Recovery routines 615 include code to initiate and manage recovery for software entity 610 and its dependencies 620-640. Similarly, recovery routines 645 call recovery routines 655. Recovery routines 615 wait for each dependent software entity recovery routine to conclude before executing its own recovery, as dependency relations are preserved by the order in which routines 625, 635, and 645 are called by recovery routines 615. Similarly, recovery routines 645 call recovery routines 655 and wait for routines 655 to complete before concluding. Once each recovery routine concludes, it sends telemetry data 152 to the calling recovery routine, as shown for example with callee recovery routines 625 and 655 returning telemetry data 152 to their respective caller recovery routines 615 and 645.

Having software entity 610 handle regional failure recovery advantageously allows software product development teams to control the recovery process by tailoring it to their specific software entity architecture and implementation. For example, a development team implementing software entities 610-650 in software product 600 may have its own protocols for recovery (e.g., specific RPO/RTO objectives) that administrators of controller 110 or developers of software entities 610-650 may not be aware of, or that deviate from default recovery protocols. Furthermore, development teams modify or change settings of third-party software entities they use when writing software products. For example, software entity 640 may be using an obsolete version of software entity 650 whose recovery routines 655 are not supported by controller 110 anymore. In this case, software entity 640 can easily call the appropriate recovery routines, as its own development team understands the details of the software they use.

While having software entities manage recovery for dependents has its advantages, some scenarios may benefit from controller 110 managing all recovery, including those of dependencies. For example, software entities 610-650 may be used with little to no modification by software product 600's development team and are thus simple to fail over due to higher predictability. Implementations addressing such a scenario are discussed in more detail with respect to FIG. 7B.

Turning now to FIG. 7B, a block diagram illustrating example elements of an alternative regional failure recovery is shown. In the illustrated embodiment, controller 110 sends regional failure notifications 140 to software entities 610-650, which proceed to return telemetry data 152. Software entity 610, which is at the top level of the software entity dependency hierarchy, sends dependency list 708 to controller 110.

Dependency list 708, in various embodiments, contains information describing the dependencies of software entities 610-650. Dependency list 708 may be in any format that enables storage and communication of such dependency information (e.g., JSON, OOP tree object). In some embodiments, dependency list 708 contains data fields identical to subscriber list 280. Using dependency list 708 allows controller 110 to orchestrate regional failure recovery and determine the order in which to send regional failure notifications 140 to each software entity at runtime, instead of letting recovery routines call each other from different respective software entities.

Once controller 110 receives dependency list 708, it generates dependency data 260 (e.g., a dependency tree) that determines an appropriate order of sending regional failure notifications 140. In the illustrated embodiment, the order of recovery starts with controller 110 sending, in parallel, first regional failure notifications 140 to software entities 620, 630, and 650, triggering their respective recovery routines. Once recovery for software entity 650 is completed, controller 110 sends a second regional failure notification 140 to software entity 640, triggering recovery routine 645. Finally, controller 110 sends a third regional failure notification 140 to software entity 610 once software entities 620-650 have completed their recovery routines.

Like other implementations of recovery routines 155, recovery routines 615-655 send telemetry data 152 to controller 110, which may then use that data to control and monitor the regional recovery process. For example, controller 110 may receive the status of a failed-over software entity when its respective recovery routine has completed and consequently send a regional failure notification 140 to the next software entity. In some embodiments, controller 110 stores that information in telemetry module 250 to track the status of each software entity and ensure the correct recovery of all software entities.

While FIGS. 7A-B describe two methods for regional failure recovery of software entities and their dependencies, other embodiments exist depending on the nature and complexity of software entity dependencies. In some cases, a combination of both architectures is implemented, where some software entities are managed by software entity 610, while other software entities are managed by controller 110.

Types of Software Entities

Figure 8:
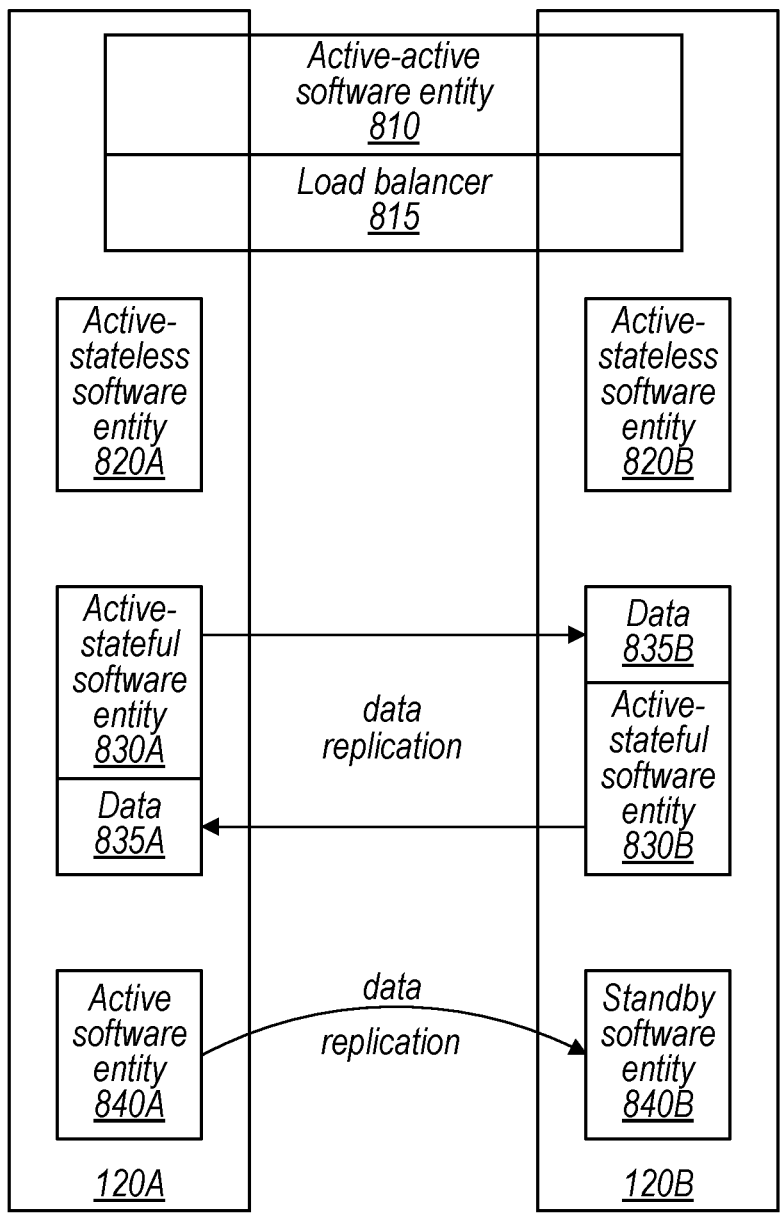
FIG. 8 is a block diagram illustrating regional failure recovery methods for different software entity paradigms, according to some embodiments.

In addition to the diversity of software entity dependencies, there are various types of patterns in which software entities can operate, some of which necessitate recovery procedures and some of which do not. FIG. 8 illustrates several types of architectural paradigms that are used, and how these paradigms affect cross-regional recovery. Four different architecture paradigms are shown. Entity 810 is a software entity that employs an active-active, load-balanced paradigm (paradigm 1); entities 820A-B employ an active-stateless paradigm (paradigm 2); entities 830A-B employ an active-stateful paradigm (paradigm 3); and entities 840A-B employ an active-standby paradigm (or active-passive paradigm) (paradigm 4).

Note that a software product may include services with different patterns. For example, a given software product might include a first service utilizing an active stateless pattern, and a second service utilizing an active stateful pattern. Similarly, a given software service might have sub-services with different patterns. For example, consider the SALESFORCE "login" service, which is presented as a single entry point, https://login.salesforce.com. This login service (which can also be considered as a "software product" within the meaning of the present disclosure) includes multiple sub-services (or services within the software product, depending on the terminology).

In an active-active architecture (paradigm 1), the components for an activity are running in both computing regions 120A and 120B at the same time (as indicated by reference numeral 810). Load balancer 815 operates to direct traffic to at least one of regions 120A-B. (In various embodiments, load balancer 815 can use various paradigms to distribute requests to regions 120—for example, using a round-robin scheme. It can also send a request to multiple regions, and whichever region responds first returns that response to the user.) There may be replication of data between regions. A global or multi-regional load balancer can thus present the single SALESFORCE entry point, which might be serviced from either a "us-east" region or a "us-west" region.

If entity 810 in computing region 120A receives a regional failure notification from controller 110, load balancer 815 can reroute traffic from computing region 120A to computing region 120B, allowing users in computing region 120A access to software entity 810. Once the recovery process for computing region 120A is completed, traffic can again be routed to computing region 120A in addition to computing region 120B.

In paradigm 2, entities 820A and 820B are active-active (stateless). A "stateless" service means that an incoming request to the service can be handled without having access to information about any previous request—i.e., there is no "state" stored that influences how the incoming request might be handled. An example of paradigm 2 within the SALESFORCE login service described above is the use of application servers in both the us-east and us-west regions. Thus, during steady state, when a request goes to https://login.salesforce.com," it is routed to us-east or us-west, where it is handled without further load balancing or connectivity between regions 120A and 120B. Under this paradigm, when there is a regional failure in region 120A, there is no need to perform any recovery routines. Entity 820B can simply take over servicing requests made through the single entry point.

In paradigm 3, software entities 830A-B are active-active (stateful) with data replication, but with no load balancing between regions. A "stateful" service relies on some state, or stored information, for processing an incoming request. These stateful services only serve traffic in the region in which they reside. As shown, when an entity 830A acquires some new data 835A, that data is communicated to region 120B for storage in data 835B. Accordingly, when region 120A fails, there is no need to perform a recovery routine with respect to entity 830A. New requests made to entity 830B will have the benefit of state data from 830 that is already stored in data 835B in region 120B. One example of paradigm 3 in the context of the SALESFORCE login service are data stores in the us-east and us-west regions that perform replication. If the us-east region fails, data accesses can continue to be served from the us-west region based on the previously replicated data.

Finally, under paradigm 4, software entities such as 840A-B follow an active-standby architecture pattern. Software entity 840A resides in computing region 120A and is a stateful service with a single primary endpoint (such as a database) to which it typically has read-write access. Software entity 840B, on the other hand, is a standby entity that has read-only access to the primary endpoint. While there may be replication between entities 840A and 840B, a failover recovery routine is generally needed for this type of paradigm. For instance, the recovery routine may spin down entity 840B as a standby node and spin it back up as a primary node after failure of region 120A.

Thus, it may be desirable in many cases to utilize paradigms 1, 2, and 3 if at all possible, such that no failover is needed.

Thus far, this disclosure has described scenarios in which a given computing region can fail over to another computing region. For example, computing region 120A can fail over to computing region 120B, and vice versa. But the disaster recovery framework that has been described does not depend on the liveness of the source region. Thus, in the extreme (and rare) scenario that a source computing region (e.g., computing region 120A) goes down completely and abruptly (such that controller 110 and computing region 120B cannot communicate with it), the disaster recovery framework can still operate. Suppose subscribing entities in computing region 120B receive a regional failure notification that indicates the source region is 120A and the target region is 120B. If software entities in region 120B do not receive communications from region 120A (or communications sent by entities in region 120B to region 120A time out), the entities in region 120B can activate/recover themselves without communicating or otherwise coordinating with corresponding entities in region 120A. For stateful services in region 120B under this scenario, data loss is expected. The amount of such loss will depend on the replication lag between the two regions.

FIG. 9 is a flow diagram of one embodiment of a method 900 for facilitating regional recovery for software entities. In various embodiments, method 900 is performed on a non-transitory computer readable medium, for example in the context of a cloud computing system (e.g., system 100). Other embodiments may include more or fewer steps than shown. For example, there may be an additional step that includes detecting the regional failure of the first computing region using a physical sensor.

Method 900 commences in step 910, in which the cloud computing system (e.g., system 100), distributed across a plurality of computing regions, stores a set of two or more software entities (e.g. software entities 150) in a first of the plurality of computing regions (e.g. computing region 120A) that have subscribed to receive regional failure notifications (e.g. regional failure notification 140) for the first computing region, the two or more software entities in the set being executable to perform any respective recovery routines needed to fail over from the first computing region to a different one of the plurality of computing regions (e.g. computing region 120B).

One of the strengths of using a subscription model for regional failure notification is the ability of the computing system to maintain a list of subscribing entities and subsequently use that list to manage regional failure recovery. In some instances, the computing system may update a data structure based on the received telemetry data to indicate current recovery success status for failover from the first computing region to the particular computing region.

Software entities are typically diverse and may have different architectures and implementations depending on the needs of the software entity's development teams. In some embodiments, a software entity is a software service. In other embodiments, software entities hold a particular architecture, such as active-active (e.g., software entities 840) and active-stateless (e.g., software entities 830). Furthermore, not all software entities need to fail over (e.g., software entity 150C): thus, some, but not all, of the set of software entities are able to fail over to the different computing region without performing any respective recovery routines.

The cloud computing system may provide an API to enable subscribing software entities to implement recovery routines. In some embodiments, the computing system provides an API that includes a set of functions usable by the set of software entities to implement their respective recovery routines.

Method 900 continues in step 920, in which the cloud computing system receives an indication of a regional failure for the first computing region. Next, in step 930, the cloud computing system publishes, to the set of software entities, a regional failure notification for the regional failure. After the publishing, the set of software entities perform any respective recovery routines to fail over to the different computing region. In some cases, the publishing immediately triggers the software entities to perform their respective recovery routines, while in other cases, the software entities perform other tasks (e.g., pre-checking routines) prior to performing the respective recovery routines. In yet some cases, the triggering is based on another source other than the publication of the regional failure notification (e.g., a fork call from orchestration module 240).

Software entities may have other dependent software entities. Accordingly, the software entity may, in some embodiments, perform any respective recovery routines needed to cause it and any dependent software entities to fail over to the different computing region. In some cases, the software entity is a software product and its dependent software entities include one or more software services. Thus, the software product may trigger its dependent software services to fail over to the different computing region. In some instances, the triggering happens after receiving telemetry data indicating the completion of the recovery routines of the dependent software entities. Similarly, one service may instruct another dependent service to fail overs. To facilitate recovery, a framework of the computer system may receive an enumeration of the one or more dependent software services of the software entity. Then, the framework may publish, using the enumeration, notifications to the set of software entities on which the particular software entity depends on. This publishing may trigger, in parallel, one or more dependent software entities of a given software entity to perform any respective recovery routines to fail over to the different computing region.

In some instances, publishing a regional failure notification causes the set of software entities to perform any required pre-recovery processing routines before failing over to the different computing region, triggers the set of software entities to perform any respective recovery routines, and returns failover status based on telemetry data received from the set of software entities. The pre-recovery processing routines may be triggered by a notification for pre-recovery processing of the software entity. The failover status may be used by the computing system to determine a failover failure from one or more of the set of software entities (e.g., software entity 150'D) and return a failure code. Alternately, triggering may be done as part of the publishing: in some embodiments, the publishing itself causes the set of software entities to individually initiate any respective recovery routines to fail over to the different computing region.

As recovery routines are executed by software entities, they may send telemetry data to the computing system. In such cases, the telemetry data may be used to assist in the regional recovery. The computing system may receive from software entities telemetry data indicative of status for the respective recovery routines. Subsequently, the data may be used to evaluate whether a failover from the first computing region to the different computing region meets a set of failover criteria. For example, a software entity may send parameters such as time elapsed or time remaining, which are evaluated against the controller's determined Recovery Time Objective for the software entity. Further, the computing system may use those parameters to check whether a timeout has occurred and subsequently initiate a rollback. Similarly, software entities may send the amount of data fail over to controller 110 which subsequently determines whether a particular Recovery Point Objective is met.

As the software entities execute their recovery routines, they may send data to the computing system for monitoring. In some embodiments, the cloud computing system receives telemetry data relating to the execution of the respective recovery routines. Telemetry data may include, for example, time elapsed since the failover was indicated, status of failover, RTO/RPO objectives, or any other data that may be used to obtain information about the software entity and its recovery process.

As noted, the applicability of this disclosure does not depend on the liveness of the source region. As such, method 900 can vary accordingly. In such alternative, the method comprises storing, by a cloud computing system distributed across a plurality of computing regions, a first set of two or more software entities in a first of the plurality of computing regions that have subscribed to receive regional failure notifications, the two or more software entities in the first set being executable to perform any respective recovery routines needed to fail over from the first computing region to a second, specified one of the plurality of computing regions. The method further comprises storing, by the cloud computing system, a second set of two or more software entities in the second computing region that have also subscribed to receive regional failure notifications. The method further comprises receiving, by the cloud computing system, an indication of a regional failure for the first computing region. Still further, the method comprises publishing, by the cloud computer system to the first and second sets of software entities, a regional failure notification for the regional failure, wherein, after the publishing, the second set of software entities perform any respective recovery routines to cause failover from the first computing region to the second computing region in response to the first computing region being unavailable and the first set of software entities thus being unable to execute. Any suitable detail disclosed in this specification can be combined with this alternative to method 900.

Figure 10:
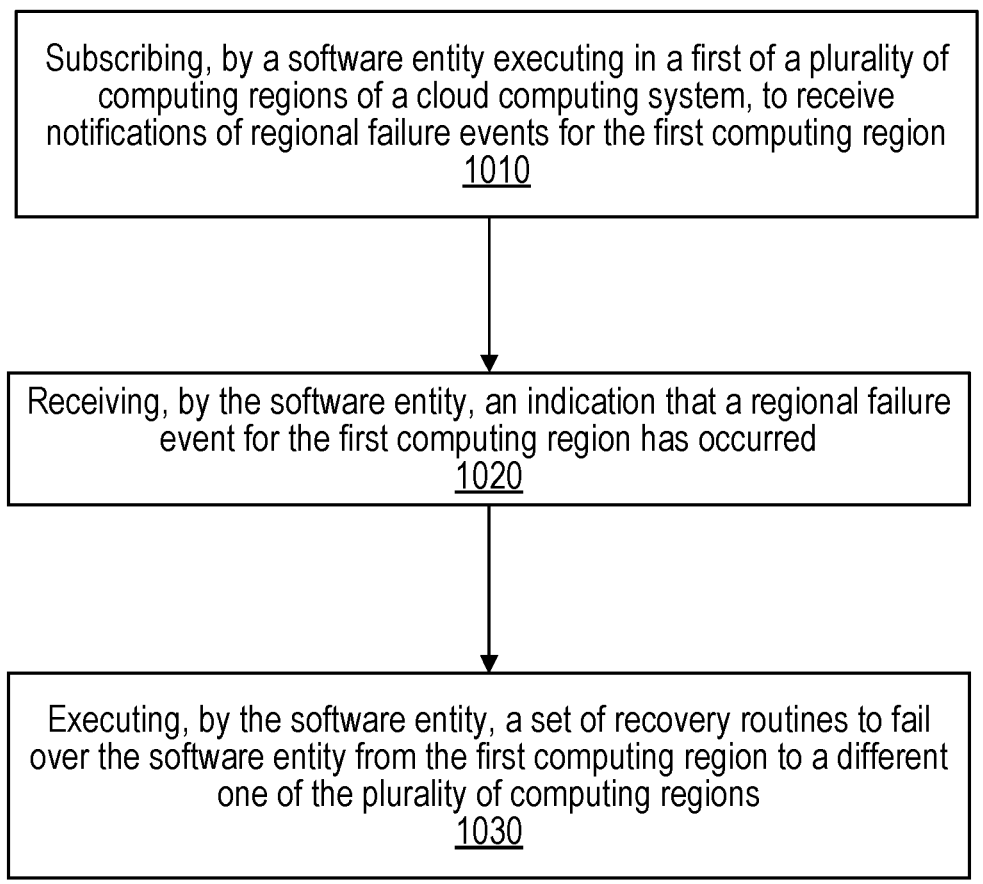
FIG. 10 is a flow diagram illustrating an exemplary cross-region failure recovery performed by a software entity, according to some embodiments.

Turning now to FIG. 10, a flow diagram of one embodiment of a method 1000 is shown. While method 900 is performed by a computer system such as one that implements a regional recovery framework, method 1000 is performed by a software entity (e.g., software entity 150) that needs to fail over following a regional failure notification (e.g., regional failure notification 130). Other embodiments may include more or fewer steps than shown. For example, the method may exclude step 1010, with receiving step 1020 including receiving a regional failure notification directly from a system administrator.

Method 1000 begins in step 1010 with the software entity, which is executing in a first of a plurality of computing regions of a cloud computing system, subscribing to receive notifications of regional failure events for the first computing region. Method 1000 continues in step 1020, in which the software entity receives an indication (e.g., regional failure notification 140) that a regional failure event for the first computing region has occurred. In some implementations, the software entity receives regional failure events from a cloud computing system (e.g., controller 110, which is part of a recovery framework provided by computing system 100). But in other embodiments, the entity may receive regional failure notifications from the administrator of the cloud computing system. Finally, in step 1030, the software entity executes a set of recovery routines (e.g., recovery routines 155) to fail over the software entity from the first computing region (e.g., computing region 120A) to a different one of the plurality of computing regions (e.g., computing region 120B).

There are a number of variations of method 1000—for example, the software entity may, as part of its recovery routines, cause dependent software entities to fail over before finalizing its failover. In another variation, a second software entity executing in a second of a plurality of computing regions of a cloud computing system subscribes to receive notifications of regional failure events for a first computing region that has a first software entity corresponding to the second software entity (e.g., each entity might provide login services for a website). Next, the second software entity receives an indication (e.g., regional failure notification 140) that a regional failure event for the first computing region has occurred. In response to a determination that the first computing region is unavailable to initiate the failover (e.g., there is no communication between the first and second regions within some threshold time period), the software entity executes a set of recovery routines (e.g., recovery routines 155) to fail over the software entity from the first computing region (e.g., computing region 120A) to a different one of the plurality of computing regions (e.g., computing region 120B).

The various techniques described herein, including methods 900, 1000, and all disclosed or suggested variations, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. A cloud computer system (or cloud computing system), as describe herein, refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   storing, by a cloud computing system distributed across a plurality of computing regions, a set of two or more software entities in a first of the plurality of computing regions that have subscribed to receive regional failure notifications for the first computing region, the two or more software entities in the set being executable to perform any respective recovery routines needed to fail over from the first computing region to a different one of the plurality of computing regions;
   receiving, by the cloud computing system, an indication of a regional failure for the first computing region;
   publishing, by the cloud computing system to the set of software entities, a regional failure notification for the regional failure;
   after the publishing, receiving, by the cloud computing system, telemetry data relating to execution of recovery routines of one or more dependent software entities on which the set of software entities depend to perform any respective recovery routines to fail over to the different computing region; and
   after receiving the telemetry data, triggering, by the cloud computing system, the set of software entities to perform any respective recovery routines to fail over to the different computing region.

2. The method of claim 1, wherein a given software entity in the set is executable to perform any respective recovery routines needed to cause the given software entity and any dependent software entities to fail over to the different computing region.

3. The method of claim 2, wherein the given software entity is a software product and the dependent software entities of the given software entity include one or more software services, and wherein the software product is executable to instruct the one or more software services to fail over to the different computing region.

4. The method of claim 1, wherein a given software entity in the set of two or more software entities is a software service.

5. The method of claim 1, wherein some, but not all, of the set of software entities are able to fail over to the different computing region without performing any respective recovery routines.

6. The method of claim 1, further comprising:
   providing, by the cloud computing system, an API that includes a set of functions usable by the set of software entities to implement their respective recovery routines.

7. The method of claim 1, further comprising:
   receiving, by the cloud computing system from the set of software entities, telemetry data relating to execution of the respective recovery routines of the set of software entities.

8. The method of claim 1, wherein the two or more software entities have subscribed to receive regional failure notifications for the first computing region via a message bus, and wherein regional failure notifications are published via the message bus.

9. The method of claim 1, wherein the publishing triggers the set of software entities to perform, in parallel, any respective recovery routines.

10. The method of claim 1, further comprising:
    publishing, by the cloud computing system to the set of software entities, a notification for pre-recovery processing, wherein, after the publishing of the notification for pre-recovery processing, the set of software entities perform any respective pre-recovery processing routines before failing over to the different computing region.

11. The method of claim 1, further comprising:
    before triggering the two or more software entities to perform respective recovery routines, the cloud computing system triggering, in parallel, the one or more dependent software entities, wherein the telemetry data is received from the one or more dependent software entities.

12. A non-transitory, computer-readable storage medium storing program instructions executable by a cloud computing system to perform operations comprising:
    receiving an indication of a regional failure for a first of a plurality of computing regions;
    in response to the indication, publishing a regional failure notification to a set of two or more software entities in the first computing region that have subscribed to receive regional failure notifications;
    after the publishing, triggering, in parallel, one or more dependent software entities on which the two or more software entities depend to perform any respective recovery routines to fail over to a different one of the plurality of computing regions;

receiving, from the one or more dependent software entities, telemetry data relating to execution of the respective recovery routines of the one or more dependent software entities; and triggering, after receiving the telemetry data, the respective recovery routines of the two or more software entities to fail over from operating in the first computing region to the different computing region.

13. The non-transitory, computer-readable storage medium of claim 12, wherein the operations further comprise:

after a regional failure notification has been published, receiving status telemetry data indicative of status for the respective recovery routines; and evaluating whether the status received telemetry data indicates that a failover from the first computing region to the different computing region meets a set of failover criteria.

14. The non-transitory, computer-readable storage medium of claim 12, wherein the operations further comprise:

after a regional failure notification has been published, receiving telemetry data indicative of status for the respective recovery routines;

in response to receiving telemetry data indicating a failover failure from one or more of the set of software entities;

returning a failure code; and performing a rollback operation for the set of software entities.

15. The non-transitory, computer-readable storage medium of claim 12, wherein the operations further comprise:

receiving, from a particular one of the set of software entities, an enumeration of one or more software entities on which the particular software entity depends; and publishing, based on the enumeration, notifications to cause the one or more software entities to perform respective recovery routines to fail over to the different computing region before the particular software entity.

16. A system, comprising:

a message publishing system; and a cloud computing system distributed across a plurality of computing regions, wherein, in response to receiving an indication of a regional failure for a first of the plurality of computing regions, the cloud computing system is configured to notify the message publishing system;

wherein the message publishing system, in response to being notified, is executable to publish a regional failure notification to a set of two or more software entities in the first computing region;

wherein the software entities in the set of two or more software entities, after receiving the published regional failure notification, are executable to perform any respective recovery routines needed to fail over from the first computing region to a different computing region of remaining ones of the plurality of computing regions; and wherein the cloud computing system is configured to:

before causing of the two or more software entities to perform respective recovery routines, trigger, in parallel, one or more dependent software entities on which the two or more software entities depend to perform any respective recovery routines to fail over to the different computing region;

receive, from the one or more dependent software entities, telemetry data relating to execution of the respective recovery routines of the one or more dependent software entities; and trigger, after receiving the telemetry data, the respective recovery routines of the two or more software entities.

17. The system of claim 16, wherein the message publishing system is executable to:

maintain a list of subscribing software entities;

receive telemetry data from the two or more software entities indicative of status of their respective recovery routines in response to the regional failure notification; and update a data structure based on the received telemetry data from the two or more software entities to indicate current recovery success status for failover from the first computing region to the different computing region.

18. The system of claim 16, wherein the first computing region has a group of services that do not have recovery routines, and wherein the group of services includes a particular service that is an active-stateless service and that has a corresponding active-stateless service in the different computing region.

19. The system of claim 18, wherein the first computing region has a second group of services that do have recovery routines, and wherein the second group of services includes a particular service that is active stateful service and that has a corresponding passive stateful service in the different computing region.

20. A non-transitory, computer-readable storage medium storing program instructions executable by a cloud computing system to perform operations comprising:

storing, by the cloud computing system distributed across a plurality of computing regions, a set of two or more software entities in a first of the plurality of computing regions that have subscribed to receive regional failure notifications for the first computing region, the two or more software entities in the set being executable to perform any respective recovery routines needed to fail over from the first computing region to a different one of the plurality of computing regions;

receiving, by the cloud computing system, an indication of a regional failure for the first computing region;

publishing, by the cloud computing system to the set of software entities, a regional failure notification for the regional failure, wherein, after the publishing, the set of software entities perform any respective recovery routines to fail over to the different computing region; and publishing, by the cloud computing system to the set of software entities, a notification for pre-recovery processing, wherein, after the publishing of the notification for pre-recovery processing, the set of software entities perform any respective pre-recovery processing routines before failing over to the different computing region.

21. A non-transitory, computer-readable storage medium storing program instructions executable by a cloud computing system to perform operations comprising:

receiving an indication of a regional failure for a first of a plurality of computing regions;

in response to the indication, publishing a regional failure notification to a set of two or more software entities in the first computing region that have subscribed to receive regional failure notifications; and after the publishing, causing the two or more software entities to perform respective recovery routines to fail over from operating in the first computing region to a different one of the plurality of computing regions;

after a regional failure notification has been published, receiving telemetry data indicative of status for the respective recovery routines;

in response to receiving telemetry data indicating a failover failure from one or more of the set of software entities;

returning a failure code; and performing a rollback operation for the set of software entities.

22. A system, comprising:

a message publishing system; and a cloud computing system distributed across a plurality of computing regions, wherein, in response to receiving an indication of a regional failure for a first of the plurality of computing regions, the cloud computing system is configured to notify the message publishing system;

wherein the message publishing system, in response to being notified, is executable to publish a regional failure notification to a set of two or more software entities in the first computing region; and wherein the software entities in the set of two or more software entities, after receiving the published regional failure notification, are executable to perform any respective recovery routines needed to fail over from the first computing region to a different computing region of remaining ones of the plurality of computing regions;

wherein the message publishing system is executable to:
maintain a list of subscribing software entities;
receive telemetry data from the two or more software entities indicative of status of their respective recovery routines in response to the regional failure notification; and
update a data structure based on the received telemetry data to indicate current recovery success status for failover from the first computing region to the different computing region.

* * * * *